(12) United States Patent
Kim et al.

(10) Patent No.: US 11,782,555 B2
(45) Date of Patent: Oct. 10, 2023

(54) DRIVING METHOD OF DISPLAY DEVICE

(71) Applicant: Samsung Display Co., Ltd., Yongin-Si (KR)

(72) Inventors: Jinwoo Kim, Hwaseong-si (KR); Soongyu Lee, Seoul (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/739,356

(22) Filed: May 9, 2022

(65) Prior Publication Data

US 2023/0090283 A1 Mar. 23, 2023

(30) Foreign Application Priority Data

Sep. 23, 2021 (KR) .......................... 10-2021-0125956

(51) Int. Cl.
*G06F 3/041* (2006.01)
*G06F 3/044* (2006.01)

(52) U.S. Cl.
CPC .......... *G06F 3/0418* (2013.01); *G06F 3/0446* (2019.05)

(58) Field of Classification Search
CPC .... G06F 3/0418; G06F 3/0412; G06F 3/0446; G06F 2203/04103; G06F 2203/04111; G06F 3/0443; G06F 3/0448; G06F 3/04182

See application file for complete search history.

(56) References Cited

U.S. PATENT DOCUMENTS

| 9,141,210 | B2 | 9/2015 | Shin et al. | |
| 9,357,045 | B2 | 5/2016 | Oishi et al. | |
| 9,569,046 | B2 | 2/2017 | Kim et al. | |
| 10,254,891 | B2 | 4/2019 | Noh | |
| 2011/0063993 | A1* | 3/2011 | Wilson | H04L 27/2647 370/254 |
| 2013/0076688 | A1* | 3/2013 | Tokutake | G06F 3/0446 345/174 |

(Continued)

FOREIGN PATENT DOCUMENTS

| KR | 10-2013-0078937 | 7/2013 |
| KR | 10-2014-0106775 | 9/2014 |

(Continued)

*Primary Examiner* — Md Saiful A Siddiqui
(74) *Attorney, Agent, or Firm* — F. Chau & Associates, LLC

(57) ABSTRACT

A method for driving a display device includes operating an input sensing part in a direct sensing mode. The input sensing part includes first sensing electrodes connected to transmission lines and second sensing electrodes connected to the sensing lines. The input sensing part operates in a noise sensing mode and proximity sensing mode when a call mode is performed. The proximity sensing mode includes generation of a proximity sensing signal concerning proximity of a user to the display device. Noise sensed in the noise sensing mode is removed from the proximity sensing signal when the proximity sensing signal indicates the user is proximate. At least one of a voltage level of a drive signal, a number of simultaneous transmission lines to which the drive signal is simultaneously applied, or a frequency of the drive signal is differently set in the noise sensing mode as compared to the proximity sensing mode.

19 Claims, 22 Drawing Sheets

(56) References Cited

U.S. PATENT DOCUMENTS

2014/0240259 A1    8/2014  Park et al.
2017/0295949 A1*  10/2017  Sizer .................... G06F 3/017
2020/0110484 A1*   4/2020  Kim ..................... G06F 3/044
2021/0191562 A1*   6/2021  Han .................... G06F 3/04182

FOREIGN PATENT DOCUMENTS

| KR | 10-1474061      | 12/2014 |
| KR | 10-2017-0045432 |  4/2017 |
| KR | 10-2140791      |  8/2020 |

* cited by examiner

FIG. 6
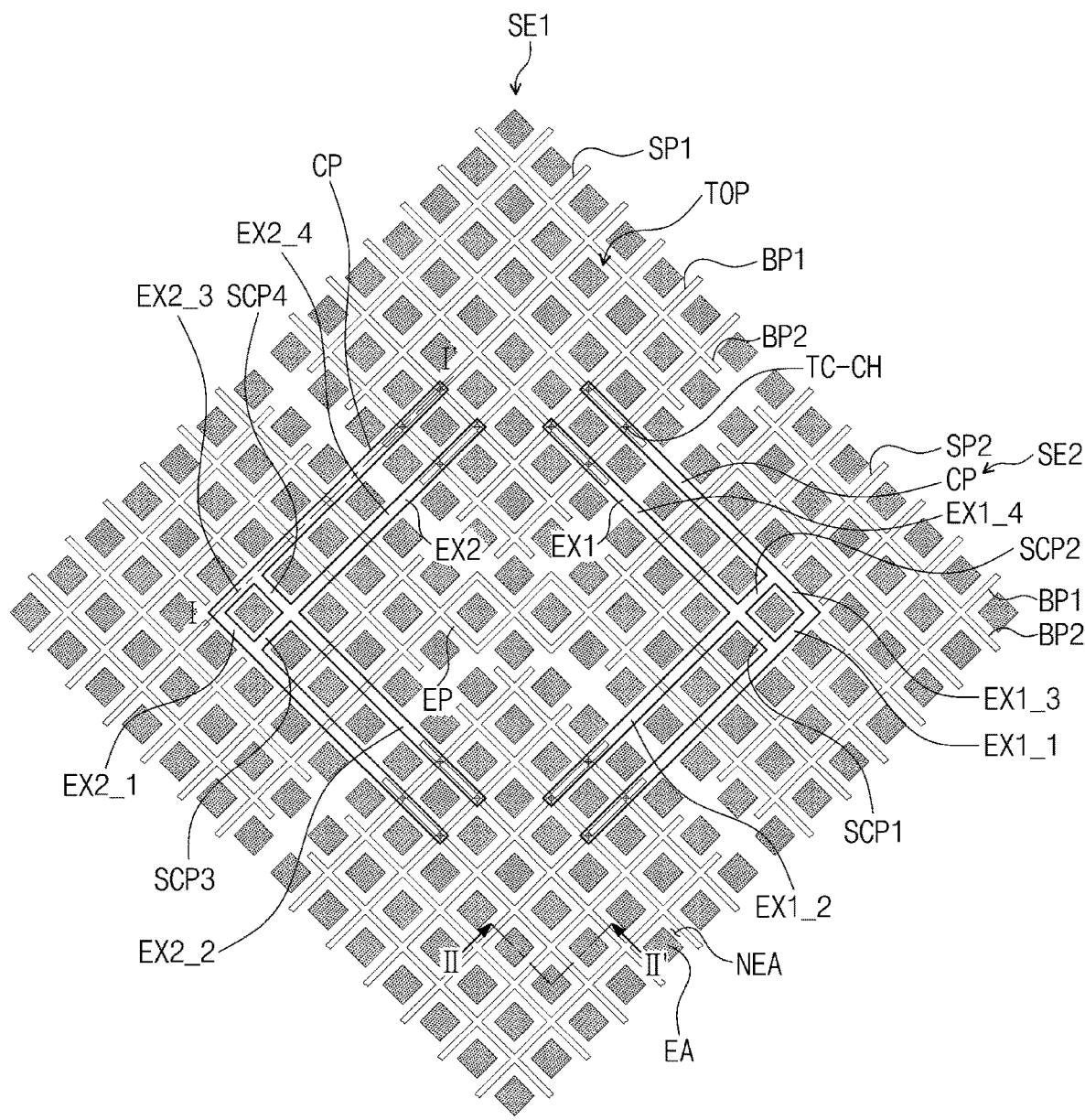
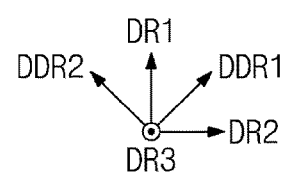

FIG. 7
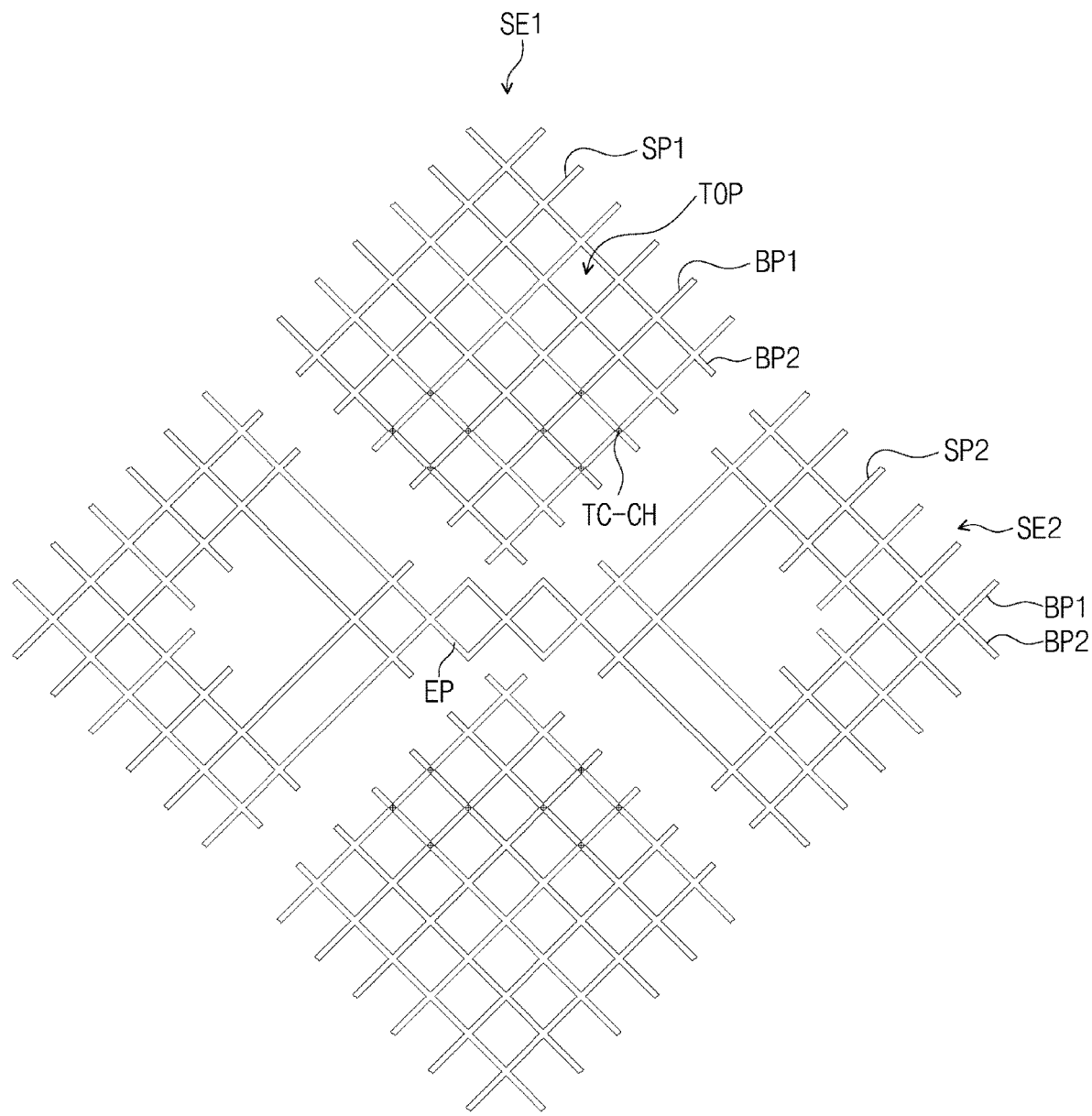
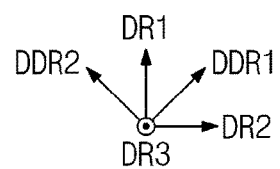

FIG. 8
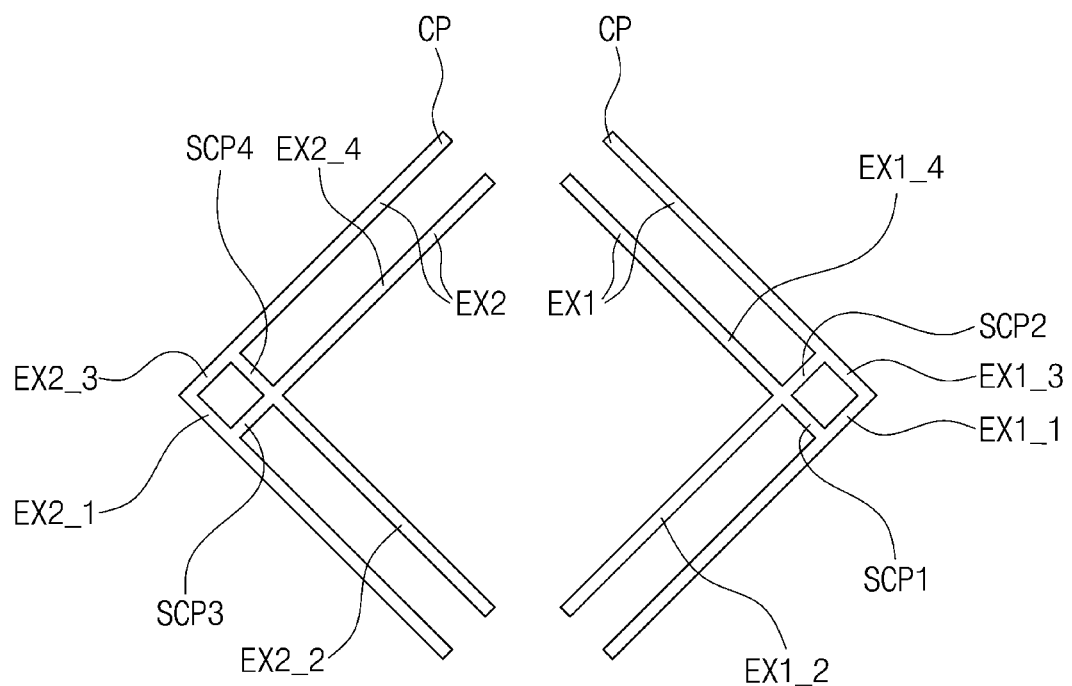
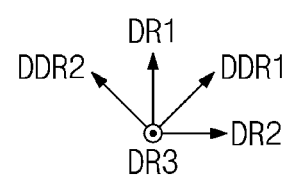

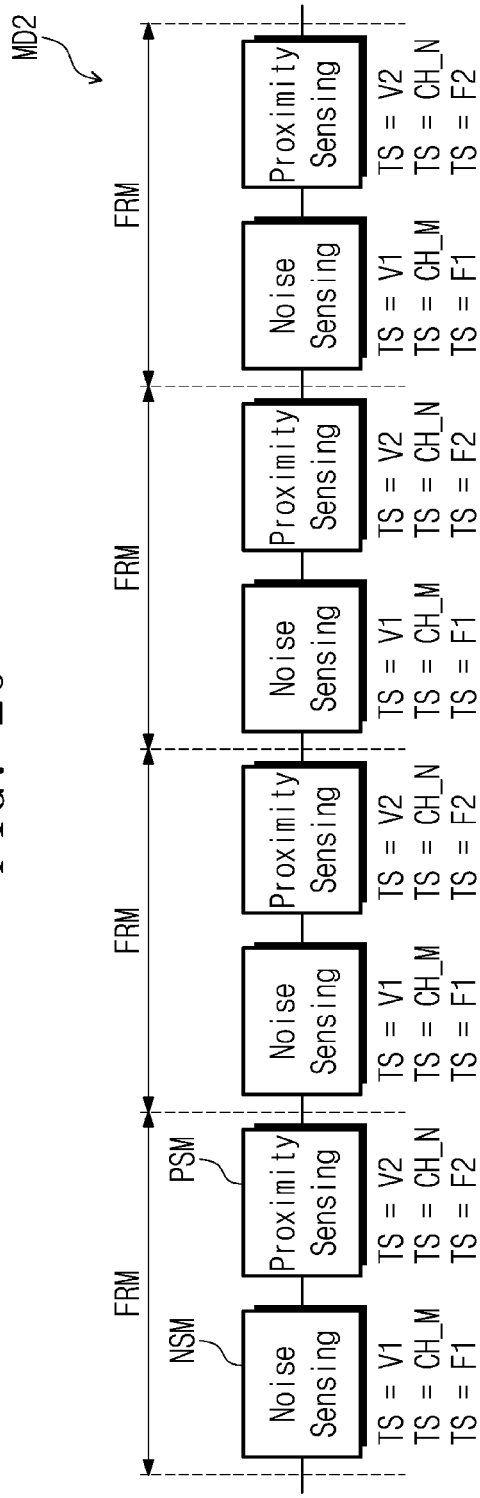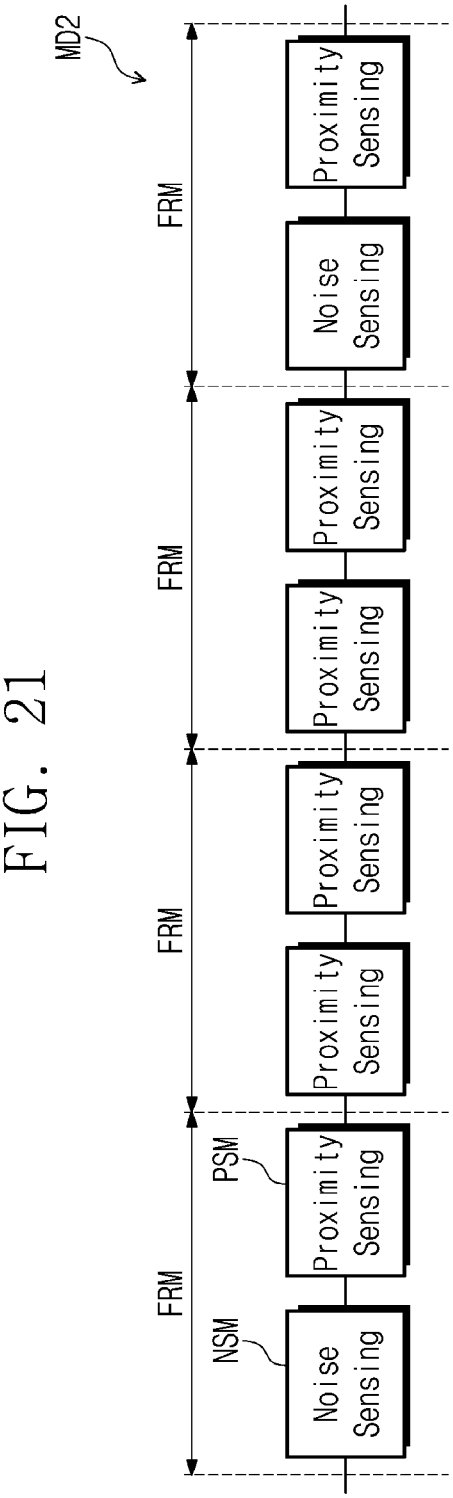

DRIVING METHOD OF DISPLAY DEVICE

CROSS-REFERENCE TO RELATED APPLICATIONS

This application claims priority under 35 U.S.C. § 119 to Korean Patent Application No. 10-2021-0125956, filed on Sep. 23, 2021 in the Korean Intellectual Property Office, the disclosure of which is incorporated by reference in its entirety herein.

1. TECHNICAL FIELD

Embodiments of the present disclosure described herein relate to a method for driving a display device.

2. DISCUSSION OF RELATED ART

Various types of electronic devices include a display device for displaying an image, such as a smart phone, a digital camera, a notebook computer, a navigation device, a smart television, and the like. The display device includes a display panel for generating an image, an input device such as an input sensing part, a camera for taking an external image, and various sensors.

The input sensing part is disposed on the display panel and senses a touch of a user. The camera generates and stores an image of an external object. The sensors may include a fingerprint sensor, a proximity sensor, and/or an illuminance sensor.

The fingerprint sensor senses a fingerprint on the display panel. The proximity sensor senses an object adjacent to the display device. The proximity sensor includes a light emitting part that generates and outputs light (e.g., infrared light) and a light receiving part that senses the light reflected from an object. The illuminance sensor senses luminance around the display device. The fingerprint sensor, the proximity sensor, and the illuminance sensor may be manufactured as separate modules and are disposed in the display device.

SUMMARY

Embodiments of the present disclosure provide a driving method of a display device for increasing the sensitivity of proximity sensing through an input sensing part in a call mode and easily performing a direct sensing mode and a proximity sensing mode in the call mode.

According to an embodiment of the present disclosure, a method for driving a display device includes operating an input sensing part in a direct sensing mode. The input sensing part includes a plurality of first sensing electrodes connected to a plurality of transmission lines and a plurality of second sensing electrodes connected to a plurality of sensing lines. The input sensing part is operated in a noise sensing mode and a proximity sensing mode when a call mode is performed. The proximity sensing mode includes generation of a proximity sensing signal concerning a proximity of a user to the display device. Noise sensed in the noise sensing mode is removed from the proximity sensing signal when the proximity sensing signal indicates a proximity state of the user. At least one of a voltage level of a drive signal applied to the plurality of transmission lines, a number of simultaneous transmission lines to which the drive signal is simultaneously applied, or a frequency of the drive signal is differently set in the noise sensing mode as compared to the proximity sensing mode.

According to an embodiment of the present disclosure, a method for driving a display device includes operating an input sensing part in a direct sensing mode. The input sensing part includes a plurality of first sensing electrodes connected to a plurality of transmission lines and a plurality of second sensing electrodes connected to a plurality of sensing lines. The input sensing part is operated in the direct sensing mode and a first proximity sensing mode, when a call mode is performed. The first proximity sensing mode is performed a first number of times. The input sensing part is operated in a second proximity sensing mode when a direct touch of a user is sensed or a proximity state of the user is sensed. The second proximity sensing mode is performed a second number of times that is different from the first number of times of the first proximity sensing mode.

BRIEF DESCRIPTION OF THE DRAWINGS

The above and other objects and features of the present disclosure will become apparent by describing in detail embodiments thereof with reference to the accompanying drawings.

FIG. 6 is an enlarged plan view of two adjacent first sensing parts and two adjacent second sensing parts illustrated in FIG. 5 according to an embodiment of the present disclosure.

FIG. 7 is a enlarged plan view illustrating only first and second detectors and an extending pattern in FIG. 6 according to an embodiment of the present disclosure.

FIG. 8 is an enlarged plan view illustrating only a connecting pattern in FIG. 6 according to an embodiment of the present disclosure.

FIGS. 17 to 20 are diagrams illustrating states of a drive signal according to embodiments of the present disclosure.

FIG. 21 is a diagram illustrating timing of noise sensing and proximity sensing according to an embodiment of the present disclosure.

DETAILED DESCRIPTION OF EMBODIMENTS

Figure 1:
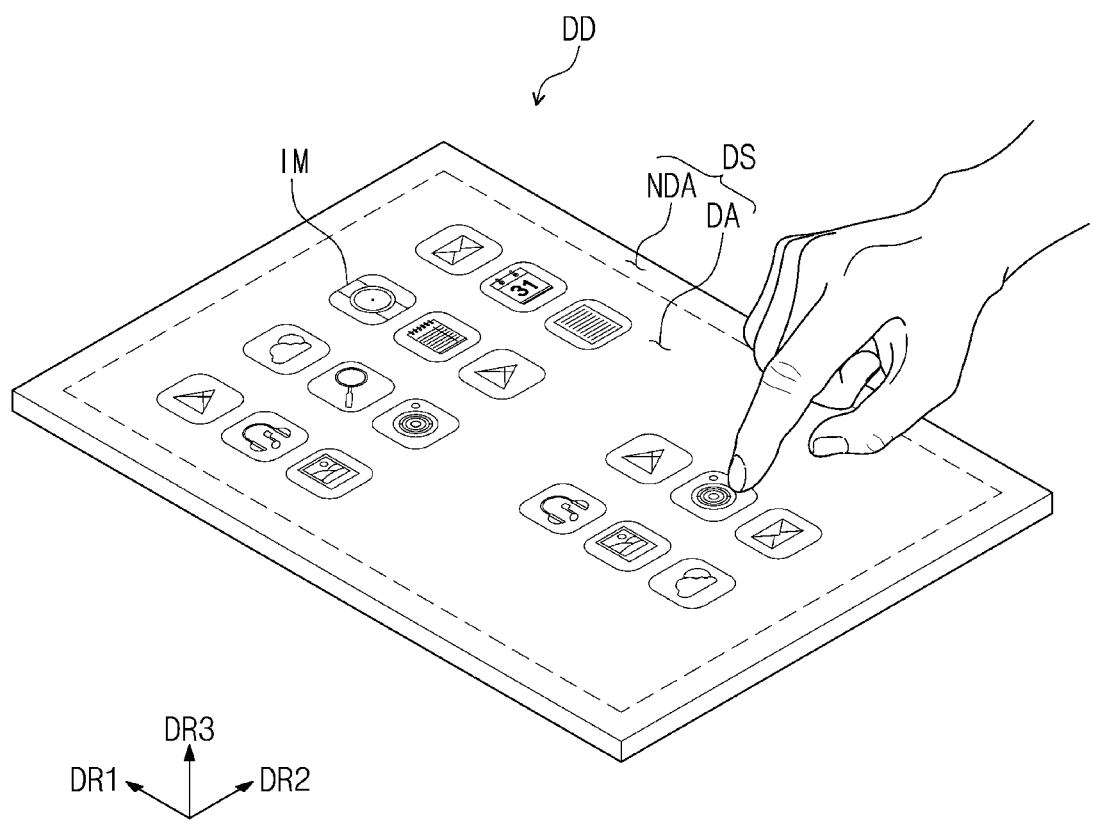
FIG. 1 is a perspective view of a display device according to an embodiment of the present disclosure.

In this specification, when it is mentioned that a component (or, an area, a layer, a part, etc.) is referred to as being "on", "connected to" or "coupled to" another component, this means that the component may be directly on, connected to, or coupled to the other component or a third component may be present therebetween. When a component (or, an area, a layer, a part, etc.) is referred to as being "directly on", "directly connected to" or "directly coupled to" another component, a third component is not present therebetween.

Identical reference numerals refer to identical components. Additionally, in the drawings, the thicknesses, proportions, and dimensions of components are exaggerated for effective description.

As used herein, the term "and/or" includes all of one or more combinations defined by related components.

Terms such as first, second, and the like may be used to describe various components, but the components should not be limited by the terms. The terms may be used only for distinguishing one component from other components. For example, without departing the scope of the present disclosure, a first component may be referred to as a second component, and similarly, the second component may also be referred to as the first component. The terms of a singular form may include plural forms unless otherwise specified.

In addition, terms such as "below", "under", "above", and "over" are used to describe a relationship of components illustrated in the drawings. The terms are relative concepts and are described based on directions illustrated in the drawing.

Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

It should be understood that terms such as "comprise", "include", and "have", when used herein, specify the presence of stated features, numbers, steps, operations, components, parts, or combinations thereof, but do not preclude the presence or addition of one or more other features, numbers, steps, operations, components, parts, or combinations thereof.

Hereinafter, embodiments of the present disclosure will be described with reference to the accompanying drawings.

FIG. 1 is a perspective view of a display device according to an embodiment of the present disclosure.

Referring to FIG. 1, the display device DD according to an embodiment of the present disclosure may have a rectangular shape with relatively long sides extending in a first direction DR1 and relatively short sides extending in a second direction DR2 crossing the first direction DR1. However, embodiments of the present disclosure are not necessarily limited thereto. In an embodiment, the display device DD may have various shapes such as a circular shape, a polygonal shape, and the like.

Hereinafter, a direction substantially vertically crossing a plane defined by the first direction DR1 and the second direction DR2 is defined as a third direction DR3. As used herein, the expression "when viewed on the plane" may mean that it is viewed in the third direction DR3.

In an embodiment, an upper surface of the display device DD may be defined as a display surface DS and may have a plane defined by the first direction DR1 and the second direction DR2. Images IM generated by the display device DD may be provided to a user through the display surface DS. For example, in the embodiment of FIG. 1, the images IM are software application icons. However embodiments of the present disclosure are not necessarily limited thereto and the images IM may be various different subject matter.

The display surface DS may include a display area DA and a non-display area NDA around the display area DA. The display area DA may display an image, and the non-display area NDA may not display an image. The non-display area NDA may surround the display area DA and may define the border of the display device DD printed in a predetermined color. For example, in an embodiment, the non-display area NDA may completely surround the display area DA (e.g., in the first and second directions DR1, DR2). However, embodiments of the present disclosure are not necessarily limited thereto and the non-display area NDA may not surround the display area DA on at least one side in some embodiments.

The display device DD may be used in large electronic devices such as a television, a monitor, and outdoor signage. In addition, the display device DD may be used in small and medium-sized electronic devices such as a personal computer, a notebook computer, a personal digital terminal, a car navigation device, a game machine, a smart phone, a tablet computer, and a camera. However, these electronic devices are merely illustrative, and the display device DD may be used in other electronic devices without departing from the spirit and scope of the present disclosure.

Figure 2:
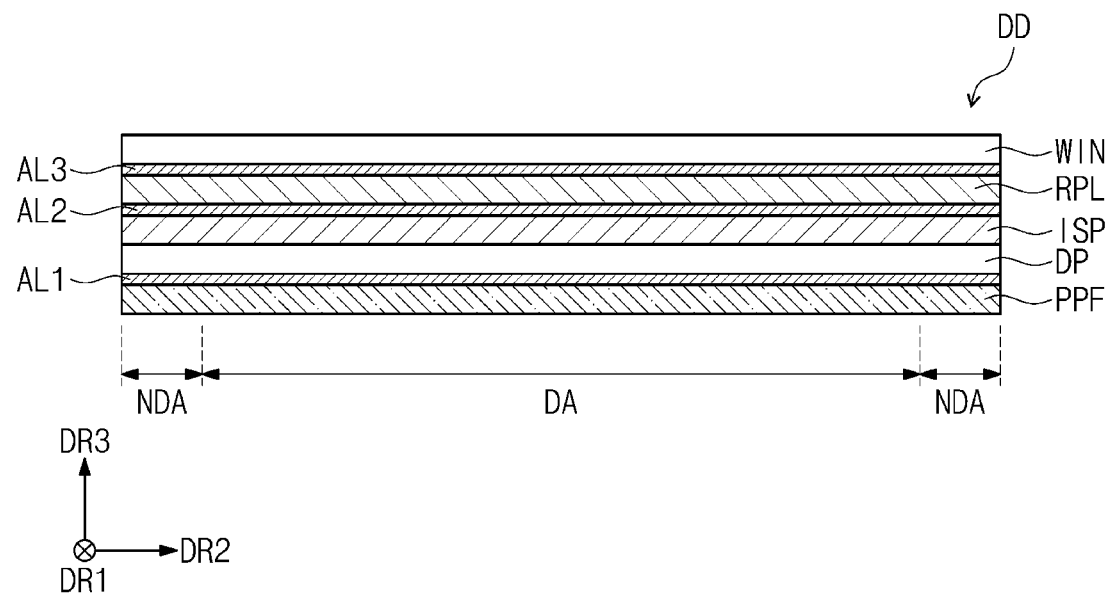
FIG. 2 is a cross-sectional view of the display device illustrated in FIG. 1 according to an embodiment of the present disclosure.

FIG. 2 is a cross-sectional view of the display device illustrated in FIG. 1.

In FIG. 2, a cross-section of the display device DD viewed in the first direction DR1 is illustrated.

Referring to FIG. 2, in an embodiment, the display device DD may include a display panel DP, an input sensing part ISP, an anti-reflection layer RPL, a window WIN, a panel protection film PPF, and first to third adhesive layers AL1, AL2, and AL3.

In an embodiment, the display panel DP may be a flexible display panel. In an embodiment, the display panel DP may be an emissive display panel. However, embodiments of the present disclosure are not necessarily limited thereto. For example, the display panel DP may be an organic light emitting display panel or an inorganic light emitting display panel. An emissive layer of the organic light emitting display panel may contain an organic light emitting material. An emissive layer of the inorganic light emitting display panel may contain quantum dots, quantum rods, and the like. Hereinafter, it will be exemplified that the display panel DP is an organic light emitting display panel for convenience of explanation.

The input sensing part ISP may be disposed over the display panel DP (e.g., in the third direction DR3). The input sensing part ISP may include a plurality of sensors for sensing an external input in a capacitive manner. In an embodiment, the input sensing part ISP may be directly manufactured on the display panel DP when the display device DD is manufactured. However, embodiments of the present disclosure are not necessarily limited thereto. For example, in an embodiment, the input sensing part ISP may be manufactured as a panel separate from the display panel DP and may be attached to the display panel DP by an adhesive layer.

The anti-reflection layer RPL may be disposed over the input sensing part ISP (e.g., in the third direction DR3). The anti-reflection layer RPL may be a film for preventing reflection of external light. The anti-reflection layer RPL may decrease the reflectivity of external light incident toward the display panel DP from above the display device DD.

When external light travelling toward the display panel DP is reflected from the display panel DP and provided back to the user, the user may visually recognize the external light as in a mirror. To prevent such a phenomenon, the anti-reflection layer RPL may include a plurality of color filters that display the same colors as pixels of the display panel DP.

In an embodiment, external light may be filtered in the same colors as those of the pixels by the color filters. In this embodiment, the external light may not be visible to the user. In an embodiment, the anti-reflection layer RPL may include a phase retarder and/or a polarizer to decrease the reflectivity of external light. However, embodiments of the present disclosure are not necessarily limited thereto.

The window WIN may be disposed over the anti-reflection layer RPL (e.g., in the third direction DR3). The window WIN may protect the display panel DP, the input sensing part ISP, and the anti-reflection layer RPL from external scratches and external shocks.

The panel protection film PPF may be disposed under the display panel DP (e.g., in the third direction DR3). The panel protection film PPF may protect a lower portion of the display panel DP. In an embodiment, the panel protection film PPF may contain a flexible plastic material such as polyethylene terephthalate (PET). However, embodiments of the present disclosure are not necessarily limited thereto.

The first adhesive layer AL1 may be disposed between the display panel DP and the panel protection film PPF (e.g., in the third direction DR3), and the display panel DP and the panel protection film PPF may be bonded to each other by the first adhesive layer AL1. The second adhesive layer AL2 may be disposed between the anti-reflection layer RPL and the input sensing part ISP (e.g., in the third direction DR3), and the anti-reflection layer RPL and the input sensing part ISP may be bonded to each other by the second adhesive layer AL2. The third adhesive layer AL3 may be disposed between the window WIN and the anti-reflection layer RPL (e.g., in the third direction DR3), and the window WIN and the anti-reflection layer RPL may be bonded to each other by the third adhesive layer AL3.

Figure 3:
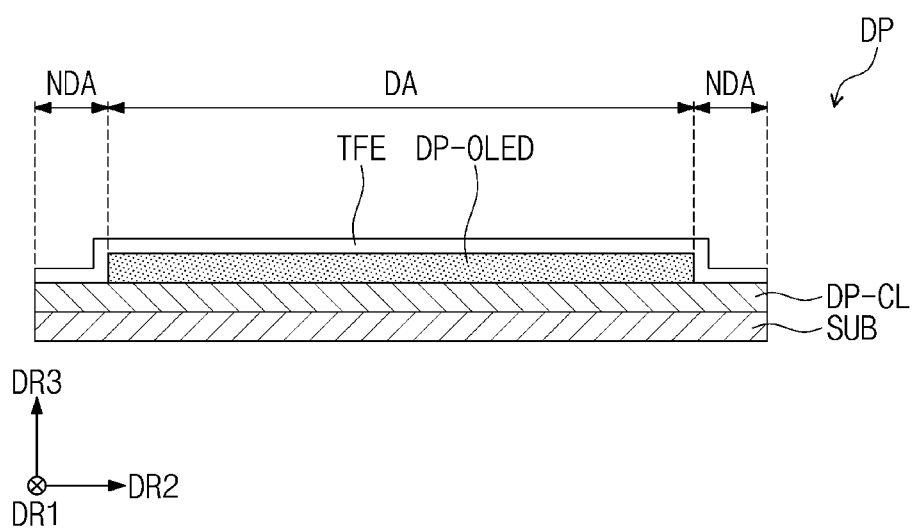
FIG. 3 is a cross-sectional view of a display panel illustrated in FIG. 2 according to an embodiment of the present disclosure.

FIG. 3 is a cross-sectional view of the display panel illustrated in FIG. 2.

In FIG. 3, a cross-section of the display panel DP viewed in the first direction DR1 is illustrated.

Referring to FIG. 3, the display panel DP may include a substrate SUB, a circuit element layer DP-CL disposed on the substrate SUB, a display element layer DP-OLED disposed on the circuit element layer DP-CL, and a thin-film encapsulation layer TFE disposed on the display element layer DP-OLED.

The substrate SUB may include a display area DA and a non-display area NDA around the display area DA. In an embodiment, the substrate SUB may contain a flexible plastic material such as glass or polyimide (PI). The display element layer DP-OLED may be disposed in the display area DA.

A plurality of pixels may be disposed in the circuit element layer DP-CL and the display element layer DP-OLED. Each of the pixels may include a transistor disposed in the circuit element layer DP-CL and a light emitting element disposed in the display element layer DP-OLED and connected to the transistor. A configuration of the pixel will be described below in detail.

The thin-film encapsulation layer TFE may be disposed on the circuit element layer DP-CL to cover the display element layer DP-OLED. The thin-film encapsulation layer TFE may protect the pixels from moisture, oxygen, and external foreign matter.

Figure 4:
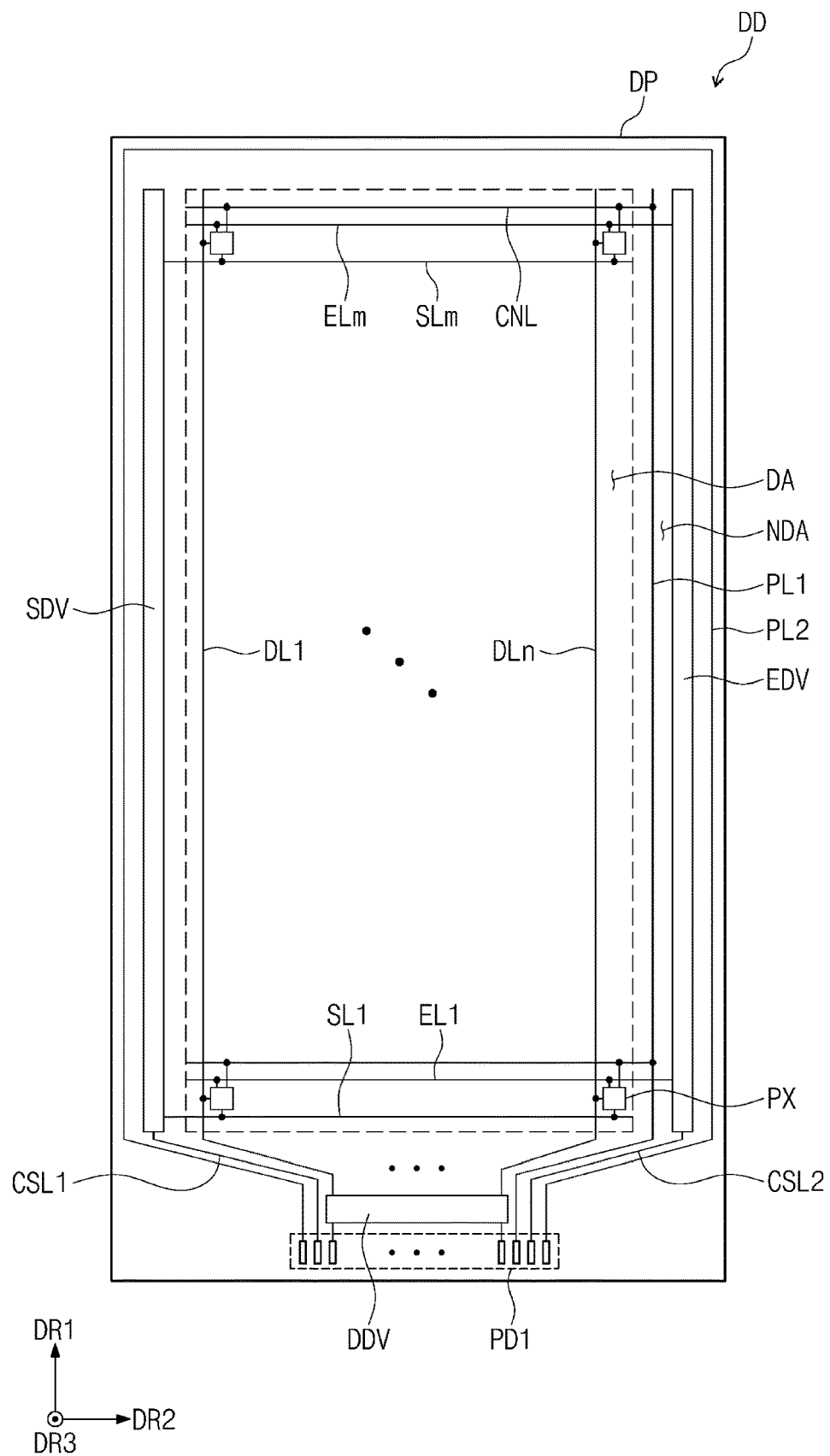
FIG. 4 is a plan view of the display panel illustrated in FIG. 2 according to an embodiment of the present disclosure.

FIG. 4 is a plan view of the display panel illustrated in FIG. 2.

Referring to FIG. 4, the display device DD may include the display panel DP, a scan driver SDV, a data driver DDV, an light emission driver EDV, and a plurality of first pads PD1.

The display panel DP may have a rectangular shape with relatively long sides extending in the first direction DR1 and relatively short sides extending in the second direction DR2. However, the shape of the display panel DP is not limited thereto. The display panel DP may include a display area DA and a non-display area NDA surrounding the display area DA.

The display panel DP may include a plurality of pixels PX, a plurality of scan lines SL1 to SLm, a plurality of data lines DL1 to DLn, a plurality of light emission lines EL1 to ELm, first and second control lines CSL1 and CSL2, first and second power lines PL1 and PL2, and connecting lines CNL. "m" and "n" are natural numbers.

The pixels PX may be disposed in the display area DA. The scan driver SDV and the light emission driver EDV may be disposed on left and right sides (e.g., in the second direction DR2) of the non-display area NDA adjacent to the relatively long sides of the display panel DP, respectively. The data driver DDV may be disposed in the non-display area NDA adjacent to one of the relatively short sides of the display panel DP. For example, as shown in FIG. 4, in an embodiment, when viewed on the plane, the data driver DDV may be adjacent to a lower end of the display panel DP (e.g., in the first direction DR1). However, embodiments of the present disclosure are not necessarily limited thereto.

The scan lines SL1 to SLm may extend in the second direction DR2 and may be connected to the pixels PX and the scan driver SDV. The data lines DL1 to DLn may extend in the first direction DR1 and may be connected to the pixels PX and the data driver DDV. The light emission lines EL1 to ELm may extend in the second direction DR2 and may be connected to the pixels PX and the light emission driver EDV.

The first power line PL1 may extend in the first direction DR1 and may be disposed in the non-display area NDA. The first power line PL1 may be disposed between the display area DA and the light emission driver EDV (e.g., in the second direction DR2). However, embodiments of the present disclosure are not necessarily limited thereto. For example, the first power line PL1 may be disposed between the display area DA and the scan driver SDV (e.g., in the second direction DR2).

The connecting lines CNL may extend in the second direction DR2 and may be arranged in the first direction DR1 and connected to the first power line PL1 and the pixels PX. A first voltage may be applied to the pixels PX through the first power line PL1 and the connecting lines CNL connected with each other.

The second power line PL2 may be disposed in the non-display area NDA and may extend along the relatively long sides of the display panel DP and the other relatively short side of the display panel DP where the data driver DDV is not disposed. In an embodiment, the second power line PL2 may be disposed outward of the scan driver SDV and the light emission driver EDV (e.g., in the second direction DR2).

In an embodiment, the second power line PL2 may extend toward the display area DA and may be connected to the pixels PX. A second voltage having a lower level than the first voltage may be applied to the pixels PX through the second power line PL2.

The first control line CSL1 may be connected to the scan driver SDV and may extend toward the lower end of the display panel DP. The second control line CSL2 may be connected to the light emission driver EDV and may extend toward the lower end of the display panel DP. The data driver DDV may be disposed between the first control line CSL1 and the second control line CSL2.

The first pads PD1 may be disposed in the non-display area NDA adjacent to the lower end of the display panel DP (e.g., in the first direction DR1) and may be closer to the lower end of the display panel DP than the data driver DDV. The data driver DDV, the first power line PL1, the second power line PL2, the first control line CSL1, and the second control line CSL2 may be connected to the first pads PD1. The data lines DL1 to DLn may be connected to the data driver DDV, and the data driver DDV may be connected to the first pads PDs corresponding to the data lines DL1 to DLn.

In an embodiment, the display device DD may further include a timing controller for controlling operations of the scan driver SDV, the data driver DDV, and the light emission driver EDV and a voltage generator for generating the first and second voltages. The timing controller and the voltage generator may be connected to the corresponding first pads PD1 through a printed circuit board.

The scan driver SDV may generate a plurality of scan signals, and the scan signals may be applied to the pixels PX through the scan lines SL1 to SLm. The data driver DDV may generate a plurality of data voltages, and the data voltages may be applied to the pixels PX through the data lines DL1 to DLn. The light emission driver EDV may generate a plurality of light emission signals, and the light emission signals may be applied to the pixels PX through the light emission lines EL1 to ELm.

The pixels PX may receive the data voltages in response to the scan signals. The pixels PX may display an image by emitting light having luminance corresponding to the data voltages in response to the light emission signals.

Figure 5:
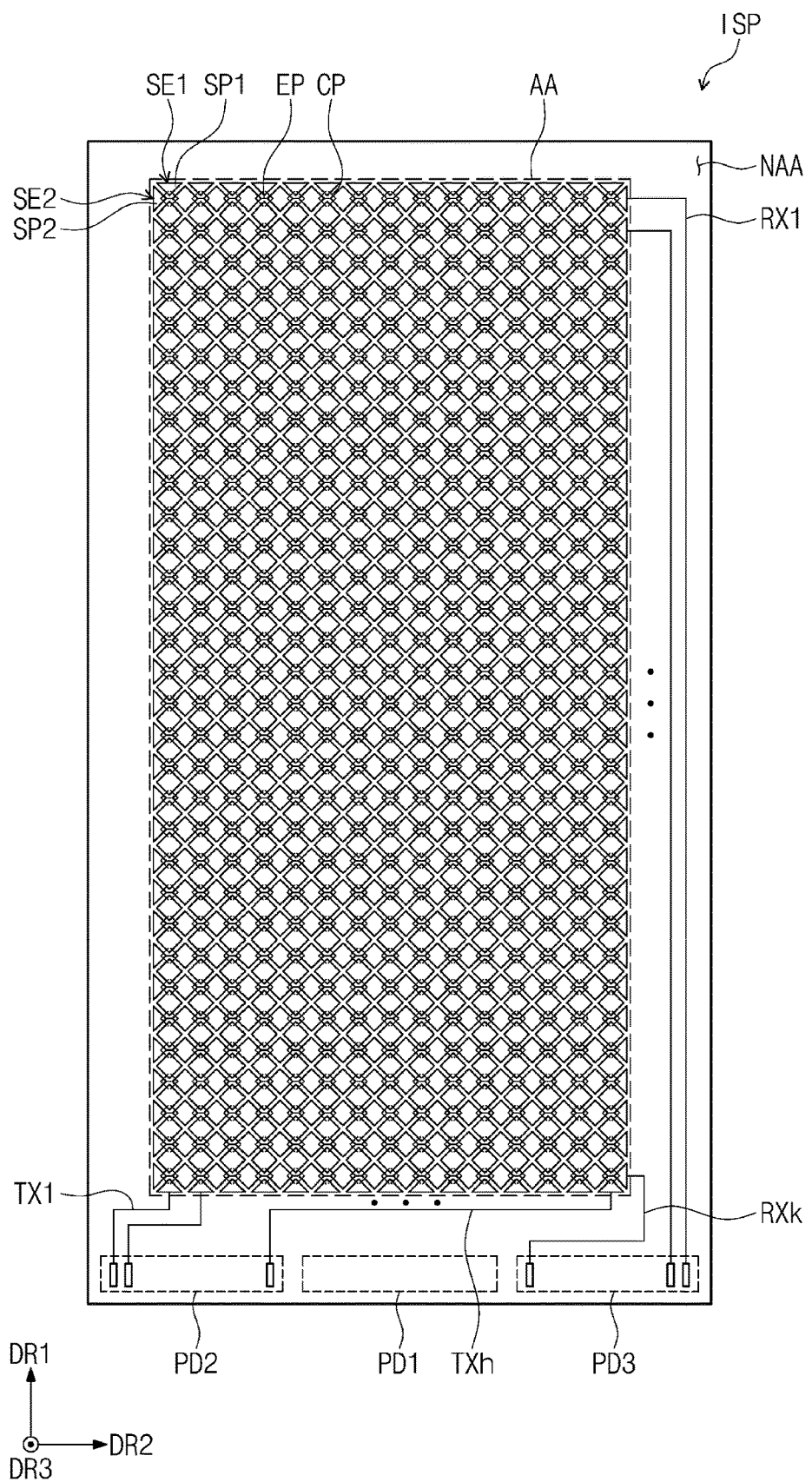
FIG. 5 is a plan view of an input sensing part illustrated in FIG. 2 according to an embodiment of the present disclosure.

FIG. 5 is a plan view of the input sensing part illustrated in FIG. 2.

Referring to FIG. 5, the input sensing part ISP may include a plurality of sensing electrodes, such as first sensing electrodes SE1 and second sensing electrodes SE2, a plurality of lines TX1 to TXh and RX1 to RXk, and a plurality of second and third pads PD2 and PD3. The sensing electrodes, the lines TX1 to TXh and RX1 to RXk, and the second and third pads PD2 and PD3 may be disposed on the thin-film encapsulation layer TFE (e.g., in the third direction DR3).

A planar area of the input sensing part ISP may include an active area AA and a non-active area NAA around the active area AA (e.g., in the first direction DR1 and/or the second direction DR2). The active area AA may overlap the display area DA, and the non-active area NAA may overlap the non-display area NDA.

The sensing electrodes, such as the first and second sensing electrodes SE1 and SE2 may be disposed in the active area AA, and the second and third pads PD2 and PD3 may be disposed in the non-active area NAA. The second pads PD2 and the third pads PD3 may be adjacent to a lower end (e.g., in the first direction DR1) of the input sensing part ISP when viewed on the plane. The first pads PD1 may be disposed between the second pads PD2 and the third pads PD3 (e.g., in the second direction DR2) when viewed on the plane.

The lines TX1 to TXh and RX1 to RXk may be connected to ends of the sensing electrodes, such as the first and second sensing electrodes SE1 and SE2, may extend to the non-active area NAA, and may be connected to the second and third pads PD2 and PD3. In an embodiment, a sensing controller for controlling the input sensing part ISP may be connected to the second and third pads PD2 and PD3 through a printed circuit board.

In an embodiment, the first sensing electrodes SE1 may extend in the first direction DR1 and are arranged in the second direction DR2. The plurality of second sensing electrodes SE2 may extend in the second direction DR2 and are arranged in the first direction DR1. The second sensing electrodes SE2 may be insulated from the first sensing electrodes SE1 and may extend to cross the first sensing electrodes SE1.

The lines TX1 to TXh and RX1 to RXk may include the plurality of first lines TX1 to TXh connected to the first sensing electrodes SE1 and the plurality of second lines RX1 to RXk connected to the second sensing electrodes SE2. "h" and "k" are natural numbers. The first lines TX1 to TXh may extend to the non-active area NAA and may be connected to the second pads PD2. The second lines RX1 to RXk may extend to the non-active area NAA and may be connected to the third pads PD3.

The first lines TX1 to TXh, when viewed on the plane, may be disposed in the non-active area NAA adjacent to the lower side of the active area AA (e.g., in the first direction DR1). The second lines RX1 to RXk, when viewed on the plane, may be disposed in the non-active area NAA adjacent to the right side of the active area AA (e.g., in the second direction DR2). The first lines TX1 to TXh may be defined as transmission lines, and the second lines RX1 to RXk may be defined as sensing lines.

Each of the first sensing electrodes SE1 may include a plurality of first sensing parts SP1 arranged in the first direction DR1 and a plurality of connecting patterns CP connecting the first sensing parts SP1. Each of the connecting patterns CP may be disposed between two first sensing parts SP1 adjacent to each other in the first direction DR1 and may connect the two first sensing parts SP1.

Each of the second sensing electrodes SE2 may include a plurality of second sensing parts SP2 arranged in the second direction DR2 and a plurality of extending patterns EP extending from the second sensing parts SP2. Each of the extending patterns EP may be disposed between two second sensing parts SP2 adjacent to each other in the second direction DR2 and may extend from the two second sensing parts SP2.

The first sensing parts SP1 and the second sensing parts SP1 may be spaced apart from each other without overlapping each other and may be alternately disposed. Capacitance may be formed by the first sensing parts SP1 and the second sensing parts SP2. The extending patterns EP may not overlap the connecting patterns CP.

In an embodiment, the first and second sensing electrodes SE1 and SE2 may be formed of silver, gold, copper, aluminum, platinum, palladium, chromium, titanium, tungsten, niobium, tantalum, vanadium, iron, manganese, cobalt, nickel, zinc, tin, molybdenum, or an alloy thereof. However, embodiments of the present disclosure are not necessarily limited thereto.

FIG. 6 is an enlarged view of two adjacent first sensing parts and two adjacent second sensing parts illustrated in FIG. 5. FIG. 7 is a view illustrating only first and second detectors and an extending pattern in FIG. 6. FIG. 8 is a view illustrating only a connecting pattern in FIG. 6.

Referring to FIGS. 6, 7, and 8, the first sensing parts SP1 and the second sensing parts SP2 may have a mesh shape. To have a mesh shape, each of the first and second sensing parts SP1 and SP2 may include a plurality of first branches BP1 extending in a first diagonal direction DDR1 and a plurality of second branches BP2 extending in a second diagonal direction DDR2.

As shown in FIG. 6, in an embodiment, the first diagonal direction DDR1 may be a direction crossing the first and second directions DR1 and DR2 on the plane defined by the first and second directions DR1 and DR2. The second diagonal direction DDR2 may be defined as a direction crossing the first diagonal direction DDR1 on the plane defined by the first and second directions DR1 and DR2. For example, the first direction DR1 and the second direction DR2 may cross each other at a right angle, and the first diagonal direction DDR1 and the second diagonal direction DDR2 may cross each other at a right angle. However, embodiments of the present disclosure are not necessarily limited thereto.

The first branches BP1 and the second branches BP2 of each of the first and second sensing parts SP1 and SP2 may cross each other and may be integrally formed with each other. Touch openings TOP having a rhombic shape may be defined by the first branches BP1 and the second branches BP2.

The area on the plane of each of the pixels PX illustrated in FIG. 4 may include an emissive area EA and a non-emissive area NEA around the emissive area EA. The non-emissive area NEA may be disposed between the emissive areas EA. A light emitting element of each of the above-described pixels PX may be disposed in the emissive area EA. Light generated from the light emitting elements may be output through the emissive areas EA. When viewed on the plane, the emissive areas EA may be disposed in the touch openings TOP, respectively.

The first and second sensing parts SP1 and SP2 may be disposed in the non-emissive area NEA. As the first and second sensing parts SP1 and SP2 are disposed in the non-emissive area EA, light generated from the light emitting elements may be normally output without being affected by the first and second sensing parts SP1 and SP2.

The connecting pattern CP may extend so as not to overlap the extending pattern EP and may connect the first sensing parts SP1. The connecting pattern CP may be connected to the first sensing parts SP1 through a plurality of contact holes TC-CH. The structure of the contact holes TC-CH will be described below with reference to FIG. 9. The connecting pattern CP may extend toward the first sensing parts SP1 through areas overlapping the second sensing parts SP2.

The extending pattern EP may be disposed between the first sensing parts SP1 (e.g., in the first direction DR1) and may extend from the second sensing parts SP2. The second sensing parts SP2 and the extending pattern EP may be integrally formed with each other. In an embodiment, the extending pattern EP may have a mesh shape. In an embodiment, the extending pattern EP, the first sensing parts SP1, and the second sensing parts P2 may be disposed in the same layer and may be formed by being simultaneously subjected to patterning with the same material.

The connecting pattern CP may include a first extension EX1 and a second extension EX2 having a shape symmetric to the first extension EX1. The extending pattern EP may be disposed between the first extension EX1 and the second extension EX2. The first extension EX1 may extend through an area overlapping one of the second sensing parts SP2 and may be connected to the first sensing parts SP1. The second extension EX2 may extend through an area overlapping the other one of the second sensing parts SP2 and may be connected to the first sensing parts SP1.

Hereinafter, the first sensing parts SP1 are defined as the upper first sensing part SP1 and the lower first sensing part SP1 depending on the relative positions thereof. Furthermore, the second sensing parts SP2 are defined as the left second sensing part SP2 and the right second sensing part SP2 depending on the relative positions thereof.

In an embodiment, predetermined portions of the first and second extensions EX1 and EX2 adjacent to one side of the first and second extensions EX1 and EX2 may be connected to the lower first sensing part SP1 through the plurality of contact holes TC-CH. Predetermined portions of the first and second extensions EX1 and EX2 adjacent to an opposite side of the first and second extensions EX1 and EX2 may be connected to the upper first sensing part SP1 through the plurality of contact holes TC-CH.

The first extension EX1 may include a first sub-extension EX1_1 and a second sub-extension EX1_2 extending in the first diagonal direction DDR1, a third sub-extension EX1_3 and a fourth sub-extension EX1_4 extending in the second diagonal direction DDR2, a first sub-conductive pattern SCP1 extending in the second diagonal direction DDR2, and a second sub-conductive pattern SCP2 extending in the first diagonal direction DDR1.

In an embodiment, predetermined portions of the first and second sub-extensions EX1_1 and EX1_2 adjacent to one side of the first and second sub-extensions EX1_1 and EX1_2 may be connected to the lower first sensing part SP1 through the plurality of contact holes TC-CH. Predetermined portions of the third and fourth sub-extensions EX1_3 and EX1_4 adjacent to one side of the third and fourth sub-extensions EX1_3 and EX1_4 may be connected to the upper first sensing part SP1 through the plurality of contact holes TC-CH.

An opposite side of the first sub-extension EX1_1 may extend from an opposite side of the third sub-extension EX1_3, and an opposite side of the second sub-extension EX1_2 may extend from an opposite side of the fourth sub-extension EX1_4. The first sub-conductive pattern SCP1 may extend from the opposite side of the fourth sub-extension EX1_4 in the second diagonal direction DDR2 and may extend to the first sub-extension EX1_1. The second sub-conductive pattern SCP2 may extend from the opposite side of the second sub-extension EX1_2 in the first diagonal direction DDR1 and may extend to the third sub-extension EX1_3.

In an embodiment, the first sub-extension EX1_1, the second sub-extension EX1_2, the third sub-extension EX1_3, the fourth sub-extension EX1_4, the first sub-conductive pattern SCP1, and the second sub-conductive pattern SCP2 may be integrally formed.

The first and second sub-extensions EX1_1 and EX1_2 may extend to cross a predetermined number of second branches BP2 adjacent to the lower first sensing part SP1 among the second branches BP2 of the right second sensing part SP2. The first branches BP1 of the right second sensing part SP2 may not be disposed in a partial area that overlaps the first and second sub-extensions EX1_1 and EX1_2 and the second sub-conductive pattern SCP2.

The third and fourth sub-extensions EX1_3 and EX1_4 may extend to cross a predetermined number of first branches BP1 adjacent to the upper first sensing part SP1 among the first branches BP1 of the right second sensing part SP2. The second branches BP2 of the right second sensing part SP2 may not be disposed in a partial area that overlaps the third and fourth sub-extensions EX1_3 and EX1_4 and the first sub-conductive pattern SCP1.

The second extension EX2 may include a fifth sub-extension EX2_1 and a sixth sub-extension EX2_2 extending in the second diagonal direction DDR2, a seventh sub-extension EX2_3 and an eighth sub-extension EX2_4 extending in the first diagonal direction DDR1, a third sub-conductive pattern SCP3 extending in the first diagonal direction DDR1, and a fourth sub-conductive pattern SCP4 extending in the second diagonal direction DDR2.

The left second sensing part SP2 may have a structure symmetric to the right second sensing part SP2, and the second extension EX2 may have a structure symmetric to the first extension EX1. Accordingly, descriptions of the fifth to eighth sub-extensions EX2_I to EX2_4 and the third and fourth sub-conductive patterns SCP3 and SCP4 will hereinafter be omitted for convenience of explanation.

Figure 9:
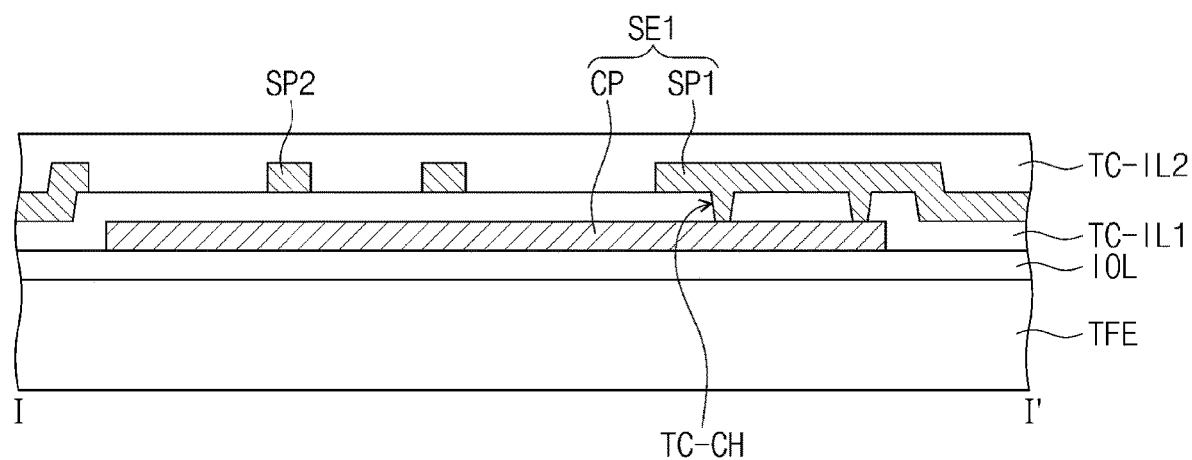
FIG. 9 is a cross-sectional view of an input sensing part taken along line I-I' illustrated in FIG. 6 according to an embodiment of the present disclosure.

FIG. 9 is a cross-sectional view taken along line I-I' illustrated in FIG. 6. Referring to FIG. 9, an insulating layer IOL may be disposed on the thin-film encapsulation layer TFE. The insulating layer IOL may include an inorganic insulating layer. At least one insulating layer IOL may be provided on the thin-film encapsulation layer TFE. For example, two inorganic insulating layers IOL may be sequentially stacked on the thin-film encapsulation layer TFE.

The connecting pattern CP may be disposed on the insulating layer IOL (e.g., directly thereon in the third direction DR3). A first insulating layer TC-IL1 may be disposed on the connecting pattern CP and the insulating layer IOL (e.g., directly thereon in the third direction DR3). The first insulating layer TC-IL1 may be disposed on the insulating layer IOL to cover the connecting pattern CP. The first insulating layer TC-IL1 may include an inorganic insulating layer or an organic insulating layer.

The first sensing parts SP1 and the second sensing parts SP2 may be disposed on the first insulating layer TC-IL1 (e.g., directly thereon in the third direction DR3). The extending pattern EP integrally formed with the second sensing parts SP2 may also be disposed on the first insulating layer TC-IL1. The connecting pattern CP may be connected to the first sensing parts SP1 through the plurality of contact holes TC-CH defined in the first insulating layer TC-IL1.

A second insulating layer TC-IL2 may be disposed on the first and second sensing parts SP1 and SP2 and the first insulating layer TC-IL1 (e.g., directly thereon in the third direction DR3). The second insulating layer TC-IL2 may be disposed on the first insulating layer TC-IL1 to cover the first sensing parts SP1 and the second sensing parts SP2. In an embodiment, the second insulating layer TC-IL2 may include an organic insulating layer.

Figure 10:
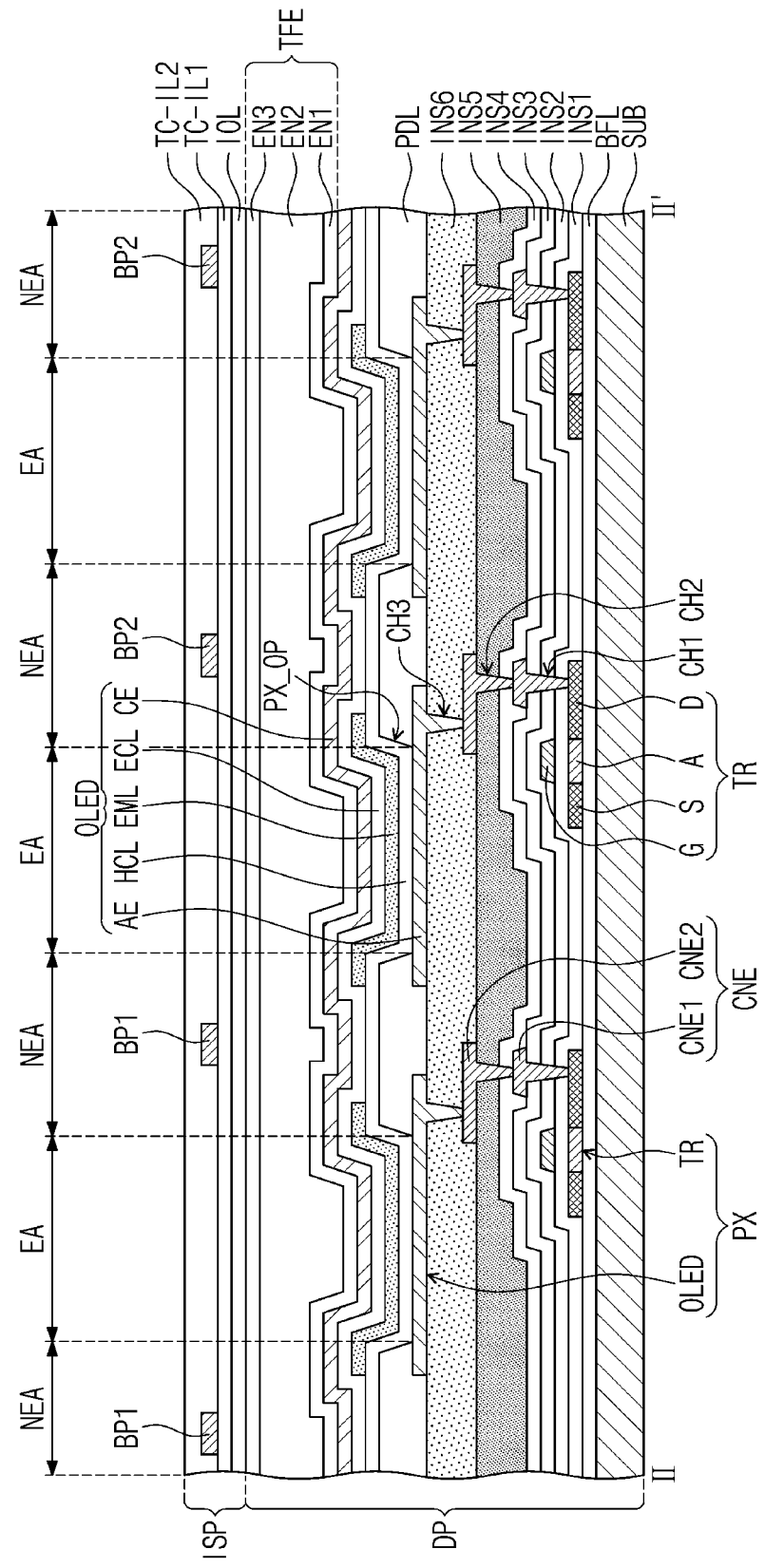
FIG. 10 is a cross-sectional view of an input sensing part taken along line II-II' illustrated in FIG. 6 according to an embodiment of the present disclosure.

FIG. 10 is a cross-sectional view taken along line II-II' illustrated in FIG. 6.

Referring to FIG. 10, each of the pixels PX may include a transistor TR and a light emitting element OLED. The light emitting elements OLED may be disposed in the emissive areas EA, respectively. The pixels PX may have substantially the same configuration, and therefore the structure of any one pixel PX will be described below.

In an embodiment, the light emitting element OLED may include a first electrode AE, a second electrode CE, a hole control layer HCL, an electron control layer ECL, and an emissive layer EML. In an embodiment, the first electrode AE may be an anode electrode, and the second electrode CE may be a cathode electrode.

The transistor TR and the light emitting element OLED may be disposed on the substrate SUB. Although one transistor TR is illustrated in FIG. 10 for convenience of explanation, the pixel PX may substantially include a plurality of transistors and at least one capacitor for driving the light emitting element OLED.

A buffer layer BFL may be disposed on the substrate SUB. In an embodiment, the buffer layer BFL may be an inorganic layer. A semiconductor pattern may be disposed on the buffer layer BFL. In an embodiment, the semiconductor pattern may contain poly silicon, amorphous silicon, or metal oxide. However, embodiments of the present disclosure are not necessarily limited thereto.

The semiconductor pattern may be doped with an N-type dopant or a P-type dopant. The semiconductor pattern may include a heavily doped area and a lightly doped area. The conductivity of the heavily doped area may be higher than the conductivity of the lightly doped area, and the heavily doped area may substantially serve as a source electrode and a drain electrode of the transistor TR. The lightly doped area may substantially correspond to an active (or, channel) area of the transistor TR.

A source S, an active area A, and a drain D of the transistor TR may be formed from the semiconductor pattern. A first insulating layer INS1 may be disposed on the semiconductor pattern. A gate G of the transistor TR may be disposed on the first insulating layer INS1. A second insulating layer INS2 may be disposed on the gate G. A third insulating layer INS3 may be disposed on the second insulating layer INS2.

A connecting electrode CNE may be disposed between the transistor TR and the light emitting element OLED and may connect the transistor TR and the light emitting element OLED. As shown in FIG. 10, in an embodiment, the connecting electrode CNE may include a first connecting electrode CNE1 and a second connecting electrode CNE2.

The first connecting electrode CNE1 may be disposed on the third insulating layer INS3 and may be connected to the drain D through a first contact hole CH1 defined in the first to third insulating layers INS1 to INS3. A fourth insulating layer INS4 may be disposed on the first connecting electrode CNE1. A fifth insulating layer INS5 may be disposed on the fourth insulating layer INS4.

The second connecting electrode CNE2 may be disposed on the fifth insulating layer INS5. The second connecting electrode CNE2 may be connected to the first connecting electrode CNE1 through a second contact hole CH2 defined in the fourth and fifth insulating layers INS4 and INS5.

A sixth insulating layer INS6 may be disposed on the second connecting electrode CNE2. The first to sixth insulating layers INS1 to INS6 may be inorganic layers or organic layers.

The first electrode AE may be disposed on the sixth insulating layer INS6. The first electrode AE may be connected to the second connecting electrode CNE2 through a third contact hole CH3 defined in the sixth insulating layer INS6. A pixel defining film PDL exposing a predetermined portion of the first electrode AE may be disposed on the first electrode AE and the sixth insulating layer INS6. An opening PX-OP for exposing the predetermined portion of the first electrode AE may be defined in the pixel defining film PDL.

In an embodiment, the hole control layer HCL may be disposed on the first electrode AE and the pixel defining film PDL. In an embodiment, the hole control layer HCL may be commonly disposed in the emissive area EA and the non-emissive area NEA. The hole control layer HCL may include a hole transporting layer and a hole injection layer.

The emissive layer EML may be disposed on the hole control layer HCL. The emissive layer EML may be disposed in an area corresponding to the opening PX_OP. The emissive layer EML may contain an organic material and/or an inorganic material. The emissive layer EML may generate any one of red light, green light, and blue light.

The electron control layer ECL may be disposed on the emissive layer EML and the hole control layer HCL. The electron control layer ECL may be commonly disposed in the emissive area EA and the non-emissive area NEA. The electron control layer ECL may include an electron transporting layer and an electron injection layer.

The second electrode CE may be disposed on the electron control layer ECL. In an embodiment, the second electrode CE may be commonly disposed in the emissive area EA and the non-emissive area NEA.

The layer having the transistor TR disposed therein may be defined as the circuit element layer DP-CL described above. The layer having the light emitting element OLED disposed therein may be defined as the display element layer DP-OLED described above.

The thin-film encapsulation layer TFE may be disposed on the second electrode CE and may cover the pixel PX. The thin-film encapsulation layer TFE may include a first encapsulation layer EN1 disposed on the second electrode CE, a second encapsulation layer EN2 disposed on the first encapsulation layer EN1, and a third encapsulation layer EN3 disposed on the second encapsulation layer EN2.

The first and third encapsulation layers EN1 and EN3 may be inorganic layers, and the second encapsulation layer EN2 may be an organic layer. The first and third encapsulation layers EN1 and EN3 may protect the pixel PX from moisture/oxygen. The second encapsulation layer EN2 may protect the pixel PX from foreign matter such as dust particles. However, embodiments of the present disclosure are not necessarily limited thereto and the thin-film encapsulation layer TFE may include at least one inorganic layer and at least one organic layer and the number of layers of the thin-film encapsulation layer TFE may vary.

The first voltage may be applied to the first electrode AE through the transistor TR, and the second voltage may be applied to the second electrode CE. Holes and electrons injected into the emissive layer EML may be combined to form excitons, and the light emitting element OLED may emit light as the excitons transition to the ground state.

The insulating layer IOL may be disposed on the third encapsulation layer EN3, the first insulating layer TC-IL1 may be disposed on the insulating layer IOL, and the first and second branches BP1 and BP2 may be disposed on the first insulating layer TC-IL1. The second insulating layer TC-IL2 may be disposed on the first insulating layer TC-IL1 to cover the first and second branches BP1 and BP2. The first and second branches BP1 and BP2 may be disposed in the non-emissive area NEA.

Figure 11A:
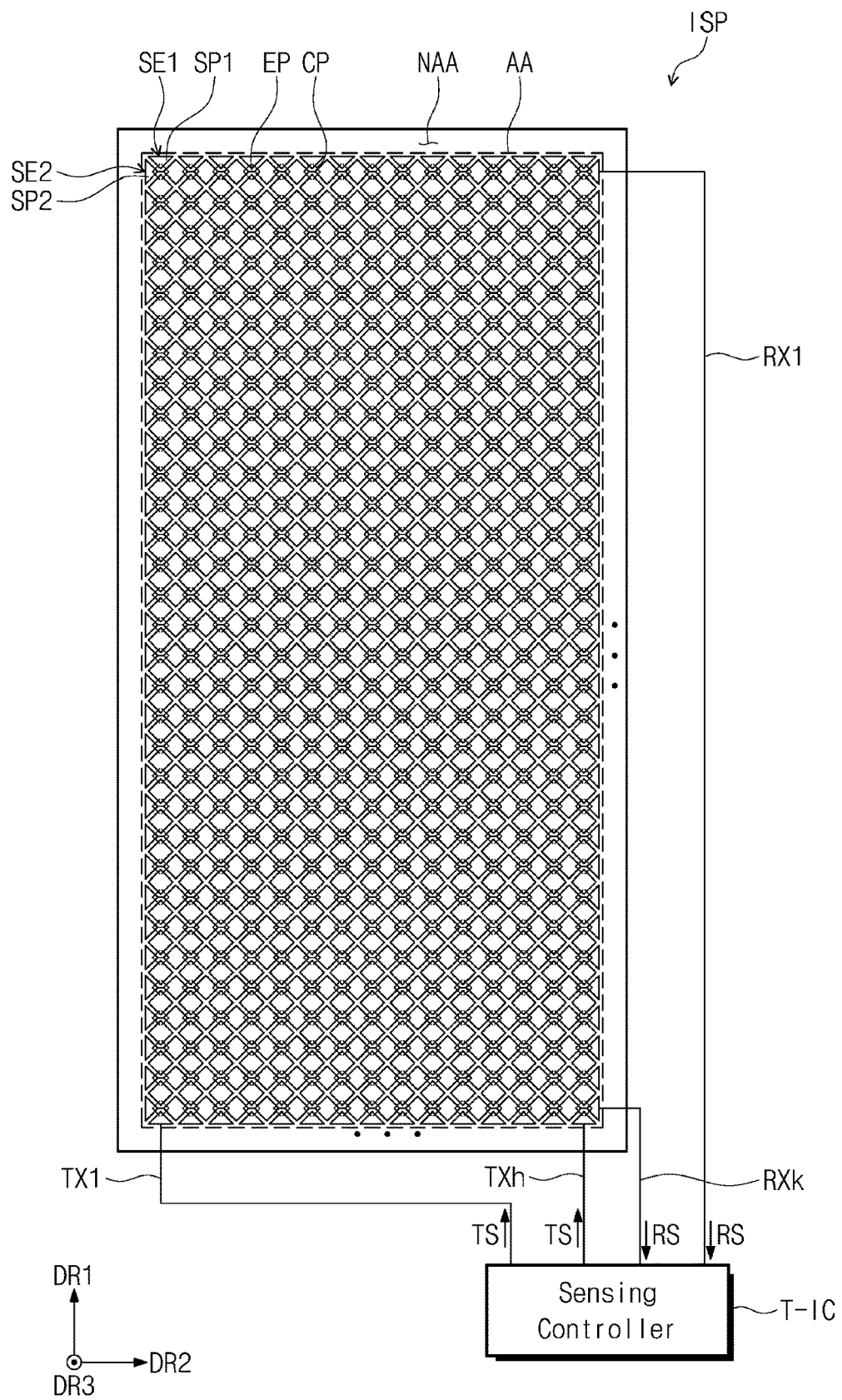
FIGS. 11A and 11B are plan views for explaining operation of the input sensing part illustrated in FIG. 5 according to embodiments of the present disclosure.
Figure 11B:
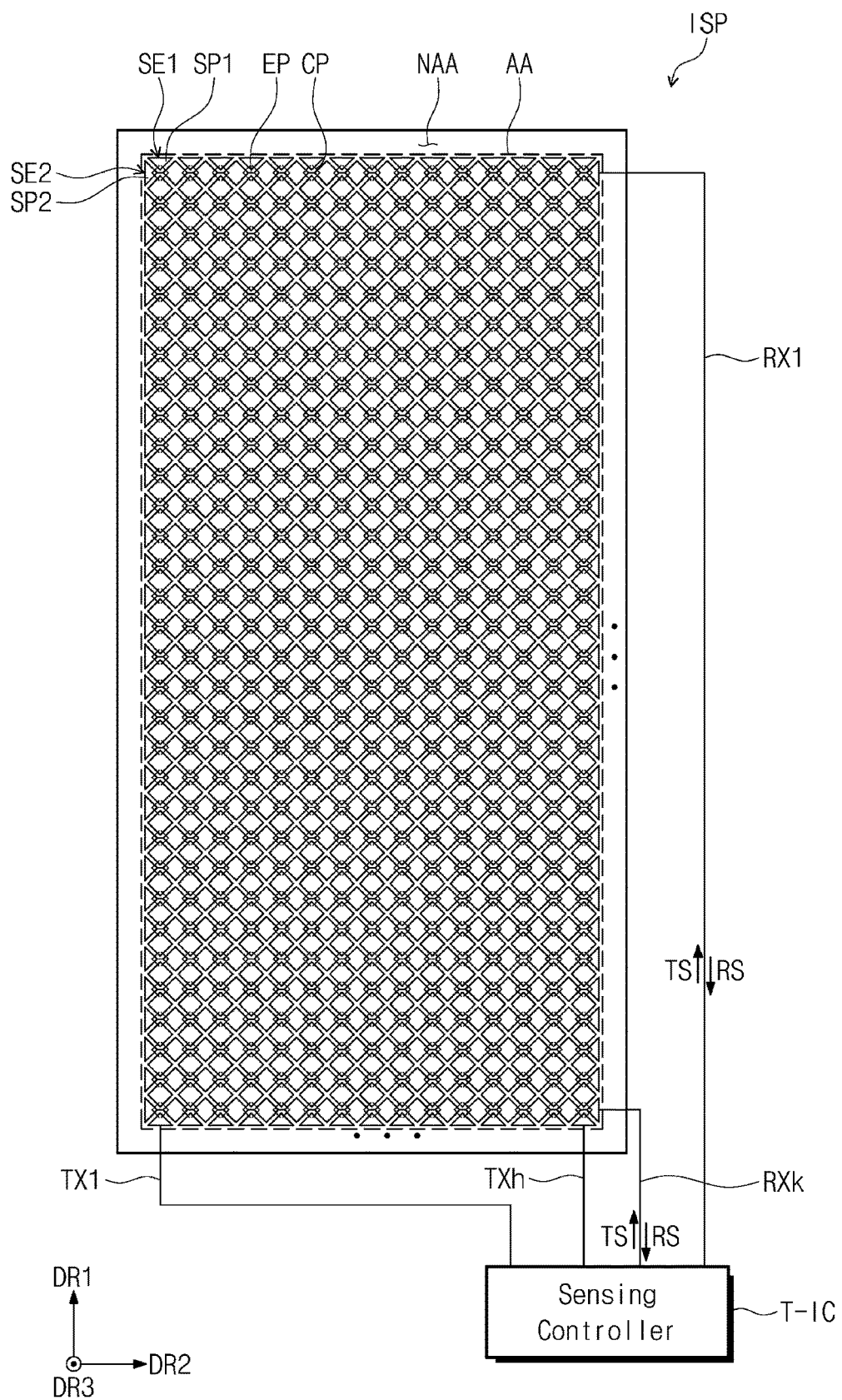

FIGS. 11A and 11B are views for explaining operation of the input sensing part illustrated in FIG. 5.

FIGS. 11A and 11B illustrate embodiments in which the non-active area NAA is smaller than that illustrated in FIG. 5 and the first and second lines TX1 to TXh and RX1 to RXk extend outside the input sensing part ISP and are connected to a sensing controller T-1C.

Referring to FIGS. 11A and 11B, the input sensing part ISP may be connected to the sensing controller T-1C that controls operation of the input sensing part ISP. The first lines TX1 to TXh may extend outside the input sensing part ISP and may be connected to the sensing controller T-1C. The second lines RX1 to RXk may extend outside the input sensing part ISP and may be connected to the sensing controller T-1C.

In an embodiment, the input sensing part ISP may be driven in a mutual sensing mode or a self-sensing mode by the sensing controller T-1C. The mutual sensing mode and the self-sensing mode may be repeatedly performed.

Referring to FIG. 11A, the sensing controller T-1C may drive the input sensing part ISP in the mutual sensing mode. The mutual sensing mode may include a drive mode and a sensing mode. In the drive mode of the mutual sensing mode, the sensing controller T-1C may apply a drive signal TS to the first lines TX1 to TXh. The drive signal TS may be applied to the first sensing electrodes SE1 through the first lines TX1 to TXh.

In the sensing mode of the mutual sensing mode, a touch of a user or a proximity state of the user may be sensed by the first and second sensing electrodes SE1 and SE2. A sensing signal RS sensed in the sensing mode may be output through the second lines RX1 to RXk and may be provided to the sensing controller T-1C. The sensing controller T-1C may generate the coordinates of the user's touch position or the user's proximity position using the sensing signal RS. A mutual sensing operation of the input sensing part ISP may be performed by the above-described operation.

Referring to FIG. 11B, the sensing controller T-1C may drive the input sensing part ISP in the self-sensing mode. The self-sensing mode may include a drive mode and a sensing mode. In the drive mode of the self-sensing mode, the sensing controller T-1C may apply a drive signal TS to the second lines RX1 to RXk. The drive signal TS may be applied to the second sensing electrodes SE2 through the second lines RX1 to RXk.

A sensing signal RS sensed in the sensing mode of the self-sensing mode may be output through the second lines RX1 to RXk and may be provided to the sensing controller T-1C. A self-sensing operation of the input sensing part ISP may be performed by the above-described operation.

Although it has been described that in the self-sensing mode, the drive signal TS and the sensing signal RS are input and output through the second lines RX1 to RXk, embodiments of the present disclosure are not limited thereto. For example, the drive signal TS may be applied to the first sensing electrodes SE1 through the first lines TX1 to TXh, and the sensing signal RS may be output through the first lines TX1 to TXh and may be provided to the sensing controller T-1C.

Figure 12:
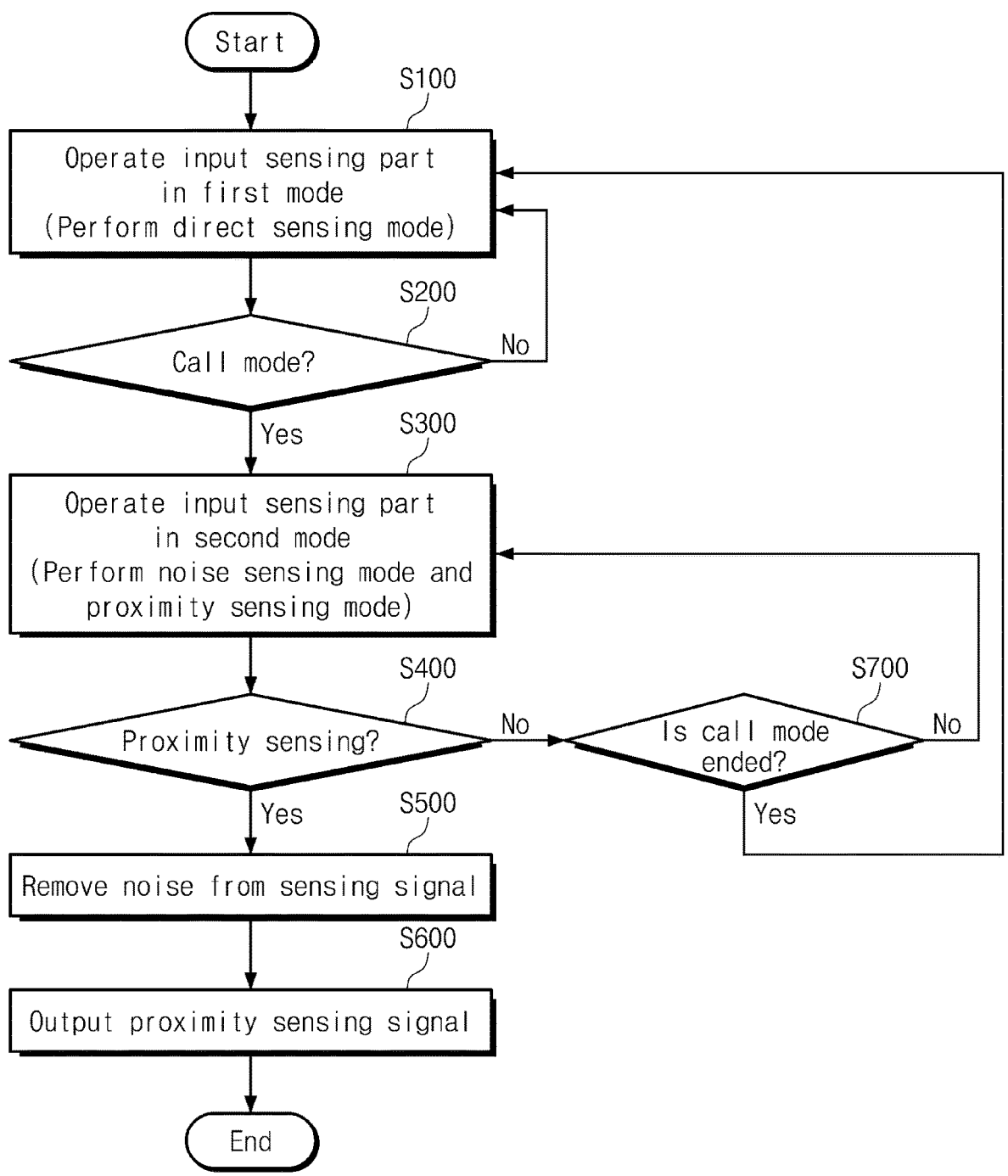
FIG. 12 is a flowchart illustrating a method for driving the display device according to an embodiment of the present disclosure.

FIG. 12 is a flowchart illustrating a method for driving the display device according to an embodiment of the present disclosure.

Referring to FIG. 12, in step S100, the input sensing part ISP may operate in a first mode. The first mode may include a direct sensing mode. The direct sensing mode may be performed in the first mode. The direct sensing mode may be defined as an operation of sensing a user's direct touch on the input sensing part ISP. For example, in an embodiment, the user when playing a video game through the display device DD may perform inputs for the game by directly touching the display device DD. The direct sensing mode may be performed a plurality of times.

In step S200, whether a call mode is performed or not may be detected. The call mode may be defined as an operation of receiving a telephone call or making a telephone call. When the call mode is performed, the user is engaged in (e.g., conducting) a telephone call. When the call mode is performed (e.g., "Yes" in step S200 in FIG. 12), that is, when the user is engaged in a telephone call, the process may proceed to step S300. When the call mode is not performed (e.g., "No" in step S200 in FIG. 12), that is, when the user is not engaged in a telephone call, the process may return to step S100.

When the call mode is performed, the input sensing part ISP may operate in a second mode in step S300. The second mode may include a noise sensing mode and a proximity sensing mode. The noise sensing mode and the proximity sensing mode may be performed in the second mode. In an embodiment, the noise sensing mode and the proximity sensing mode may be performed a plurality of times.

When the noise sensing mode is performed, noise caused by a parasitic capacitor PCP (FIG. 13) between the input sensing part ISP and the display panel DP may be sensed. In the proximity sensing mode, a proximity state of the user to the input sensing part ISP may be sensed. For example, when the user receives a telephone call, the user may conduct the telephone call while holding a mobile phone relatively close to the user's ear. When the user brings the mobile phone relatively close to the user's ear, the proximity state of the user may be sensed by the input sensing part ISP. The proximity state of the user being sensed (e.g., "Yes" in step S400 in FIG. 12) means that the input sensing part ISP determines that the user is proximate to the device that includes the input sensing part ISP, such as a mobile phone. For example, the proximity state of the user being sensed may include the input sensing part ISP determining that the user is within a predetermined length from the device that includes the input sensing part ISP.

At least one of the voltage level of the drive signal TS applied to the first lines TX1 to TXh, the number of simultaneous lines to which the drive signal TS is simultaneously applied, or the frequency of the drive signal TS may be differently set in the noise sensing mode and the proximity sensing mode. This operation will be described below in detail.

In step S400, whether the proximity state of the user to the input sensing part ISP is sensed or not may be detected. When the proximity state of the user is sensed in step S400, the process may proceed to step S500. In step S500, the noise sensed in the above-described noise sensing mode may be removed from the sensing signal RS. The sensing signal RS may be a proximity sensing signal generated in step S400.

In step S600, a proximity sensing signal obtained by removing the noise may be output, and thus the sensitivity of the proximity sensing mode for sensing the proximity state of the user may be increased. When the proximity state of the user to the mobile phone is sensed, a predetermined event corresponding to the proximity sensing may be performed. For example, since the user cannot see the screen of the mobile phone when bringing the mobile phone close to the user's ear, the display screen may be turned off, and a power saving mode may be performed when the proximity state of the user is sensed.

When the proximity state of the user is not sensed in step S400 (e.g., the user is detected as not being close to the mobile phone), the process may proceed to step S700, and whether the call mode is ended or not may be detected. When it is detected in step S700 that the call mode is ended, the process may proceed to step S100 such that the input sensing part ISP operates in the first mode since the telephone call is ended. When it is detected in step S700 that the call mode is not ended, the process may proceed to step S300 such that the input sensing part ISP operates in the second mode since the telephone call is maintained.

Figure 13:
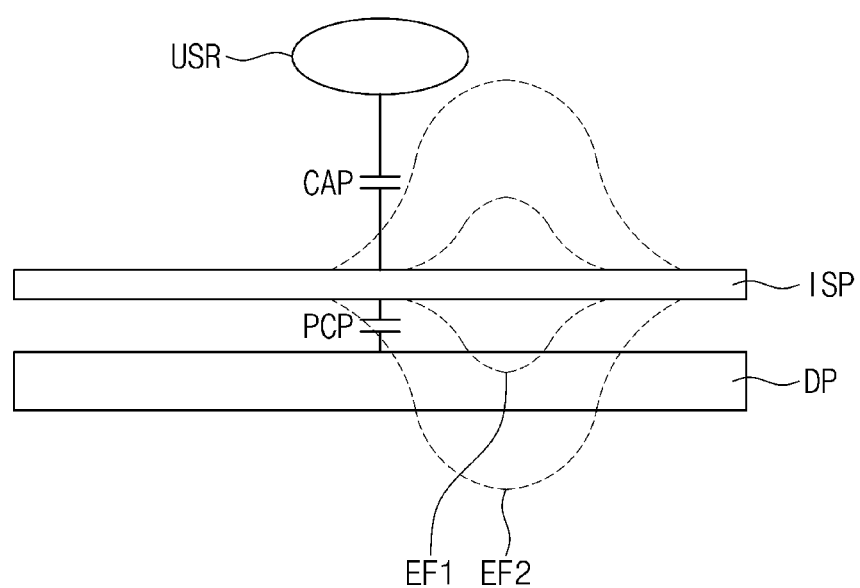
FIG. 13 is a side view illustrating the display panel, the input sensing part, and a proximity state of a user in a call mode of FIG. 12 according to an embodiment of the present disclosure.

FIG. 13 is a view illustrating the display panel, the input sensing part, and the proximity state of the user in the call mode of FIG. 12.

Referring to FIGS. 12 and 13, the display panel DP may be disposed under the input sensing part ISP, and the user USR may be closely positioned above the input sensing part ISP. A capacitor CAP may be formed between the user USR and the display panel DP. A parasitic capacitor PCP may be formed between the display panel DP and the input sensing part ISP.

The parasitic capacitor PCP may be formed by conductors of the display panel DP and conductors of the input sensing part ISP. The parasitic capacitor PCP may have a capacitance greater than that of the capacitor CAP.

When the drive signal TS is applied to the input sensing part ISP, a proximity sensing operation may not be normally performed due to noise caused by the parasitic capacitor PCP. The parasitic capacitor PCP, which has a capacitance greater than that of the capacitor CAP, may cause noise in the drive signal TS applied to the first sensing electrodes SE1. In an embodiment of the present disclosure, the noise may be detected first, and thereafter the noise may be removed from a sensing signal obtained by sensing the proximity state of the user.

In the noise sensing mode, noise may be sensed. In the noise sensing mode, noise of the input sensing part ISP caused by the display panel DP may be sensed.

In the noise sensing mode, an electric field generated from the input sensing part ISP may be formed in a predetermined magnitude such that the proximity state of the user USR is not sensed. For example, in the noise sensing mode, an electric field EF1 (hereinafter, referred to as the first electric field) of the input sensing part ISP depending on the drive signal TS may be formed in such a magnitude that the first electric field EF1 is applied to the display panel DP, but is not applied to the user USR above the input sensing part ISP.

Since the first electric field EF1 is formed around the input sensing part ISP and is not applied to the user USR, noise generated in the input sensing part ISP by the display panel DP may be sensed, and the proximity state of the user USR may not be sensed.

In the proximity sensing mode, to sense the proximity state of the user USR, an electric field EF2 (hereinafter, referred to as the second electric field) of the input sensing part ISP depending on the drive signal TS may be formed in such a magnitude that the second electric field EF2 is applied to the user USR above the input sensing part ISP as well as the input sensing part ISP. As the second electric field EF2 is formed around the input sensing part ISP, the proximity state of the user USR may be sensed. Furthermore, as the second electric field EF2 is formed around the input sensing part ISP, the noise of the input sensing part ISP caused by the display panel DP may also be sensed.

The sensing signal RS obtained by sensing the proximity state of the user USR through the second electric field EF2 may include the noise caused by the display panel DP. Since the noise caused by the display panel DP is detected through the first electric field EF1 in the noise sensing mode, the detected noise signal may be removed from the sensing signal RS including the noise. For example, the noise signal may be subtracted from the sensing signal including the proximity sensing signal and the noise signal as follows.

(Proximity Sensing Signal+Noise Signal)−Noise Signal=Proximity Sensing Signal

In this embodiment, the sensing signal RS may include the proximity sensing signal and may not include the noise.

Hereinafter, a method for forming the first electric field EF1 and the second electric field EF2 will be described.

Figure 14:
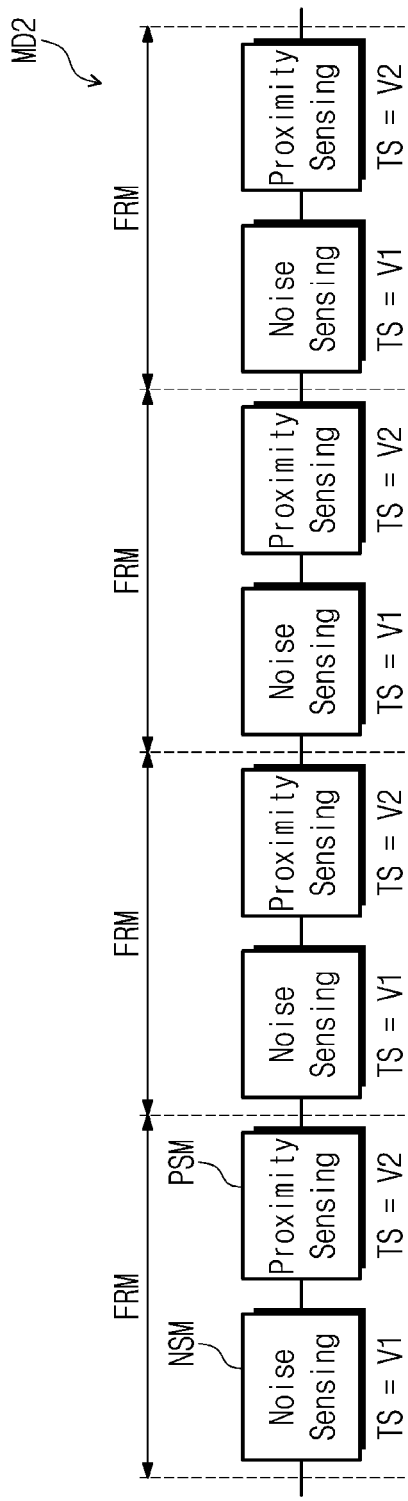
FIGS. 14 to 16 are diagrams illustrating timings of noise sensing and proximity sensing and states of a drive signal according to embodiments of the present disclosure.
Figure 15:
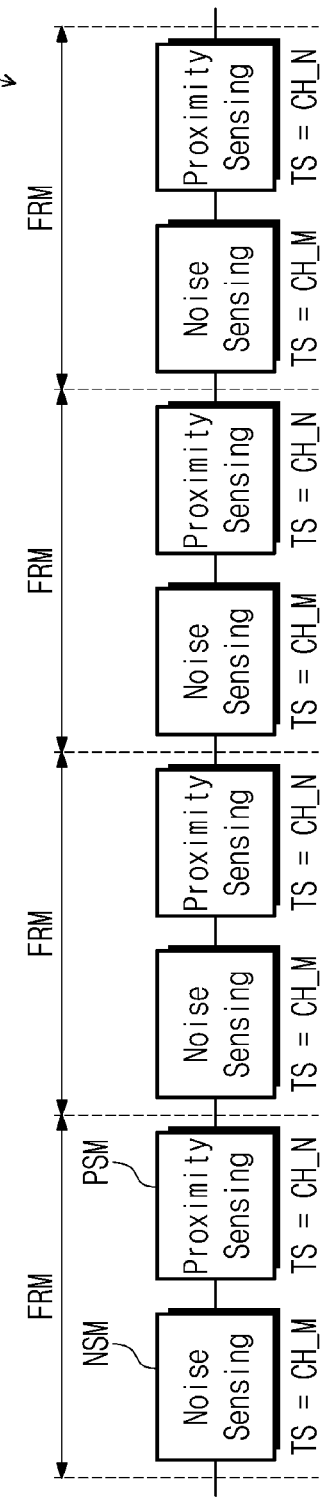
Figure 16:
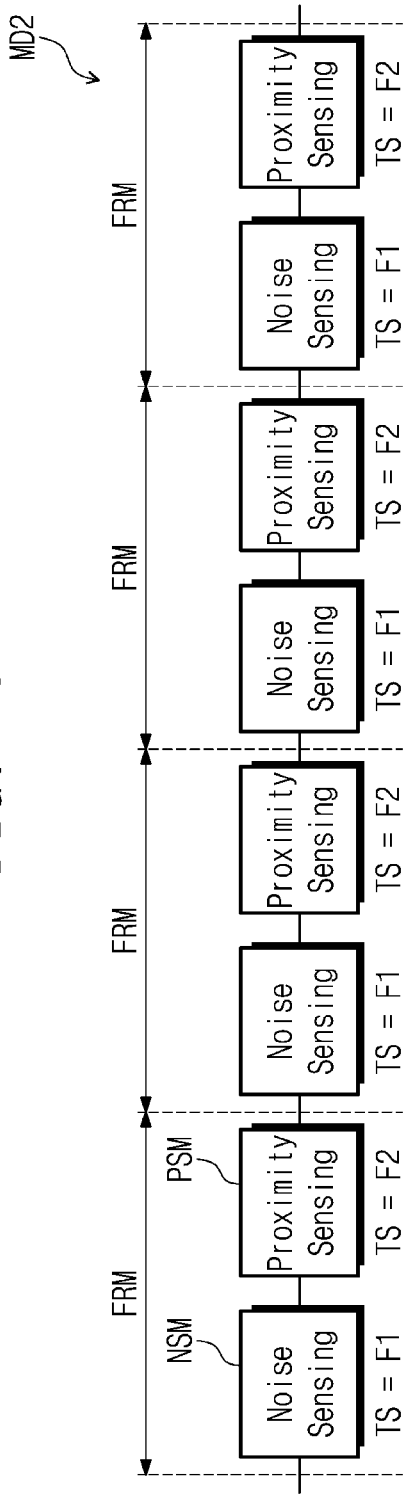

FIGS. 14 to 16 are views illustrating timings of noise sensing and proximity sensing and states of a drive signal according to embodiments of the present disclosure.

Hereinafter, FIG. 13 will be described together with FIGS. 14 to 16 according to the need for explanation and a description of similar or identical elements may be omitted for convenience of explanation.

Referring to FIGS. 14 to 16, in the second mode MD2, a noise sensing mode NSM and a proximity sensing mode PSM may be performed in each frame FRM. Accordingly, the noise sensing mode NSM and the proximity sensing mode PSM may be repeatedly performed.

Although it is exemplified in FIGS. 14-16 that the noise sensing mode NSM and the proximity sensing mode PSM are alternately performed once in each frame FRM, the number of times that the noise sensing mode NSM and the proximity sensing mode PSM are performed and the sequence of the noise sensing mode NSM and the proximity sensing mode PSM are not necessarily limited thereto.

Referring to FIGS. 13 and 14, the magnitude of an electric field may be proportional to a voltage level. For example, the magnitude of the electric field may be increased as the voltage level is raised and may be decreased as the voltage level is lowered.

In the noise sensing mode NSM, the drive signal TS may have a first voltage V1. In the proximity sensing mode PSM, the drive signal TS may have a second voltage V2. In an embodiment, the level of the first voltage V1 may be lower than the level of the second voltage V2. For example, the level of the voltage of the drive signal TS in the noise sensing mode NSM may be lower than the level of the voltage of the drive signal TS in the proximity sensing mode PSM. For example, in an embodiment, the first voltage V1 may be about 3 V, and the second voltage V2 may be about 12 V. However, embodiments of the present disclosure are not necessarily limited thereto and the amounts of the first and second voltages V1, V2 may vary.

In the noise sensing mode NSM, the first electric field EF1 may be formed when the drive signal TS has the first voltage V1 with a lower level. In the proximity sensing mode PSM, the second electric field EF2 may be formed when the drive signal TS has the second voltage V2 with a higher level. In an embodiment of the present disclosure, the noise sensing mode NSM may be more easily performed by adjusting the level of the voltage of the drive signal TS, such as adjusting the voltage of the drive signal TS from the second voltage V2 to the first voltage V1.

Referring to FIGS. 13 and 15, the number of first lines to which the drive signal TS is simultaneously applied in the noise sensing mode NSM may be less than the number of first lines to which the drive signal TS is simultaneously applied in the proximity sensing mode PSM. Hereinafter, the first lines TX1 to TXh are defined as transmission lines.

In an embodiment, the number of simultaneous transmission lines CH_M to which the drive signal TS is simultaneously applied in the noise sensing mode NSM may be M. The number of simultaneous transmission lines CH_N to which the drive signal TS is simultaneously applied in the proximity sensing mode PSM may be N. M may be a natural number, and N may be a natural number that is greater than M.

For example, in an embodiment, the number of the simultaneous transmission lines CH_M to which the drive signal TS is simultaneously applied in the noise sensing mode NSM may be 4. In this embodiment, the drive signal TS may be simultaneously applied to the first to fourth transmission lines and thereafter may be simultaneously applied to the fifth to eighth transmission lines. This operation may be identically performed up to the last transmission line.

For example, in an embodiment the number of simultaneous transmission lines CH_N to which the drive signal TS is simultaneously applied in the proximity sensing mode PSM may be 20. In this embodiment, the drive signal TS may be simultaneously applied to the 1st to 20th transmission lines and thereafter may be simultaneously applied to the 21st to 40th transmission lines. This operation may be identically performed up to the last transmission line.

An electric field may be proportional to the number of simultaneous transmission lines to which the drive signal Ts is simultaneously applied. The magnitude of the electric field may be increased with an increase in the number of simultaneous transmission lines to which the drive signal Ts is simultaneously applied.

When the drive signal TS is simultaneously applied to M simultaneous transmission lines CH_M in the noise sensing mode NSM, the first electric field EF1 may be formed. When the drive signal TS is simultaneously applied to N simultaneous transmission lines CH_N in the proximity sensing mode PSM, the second electric field EF2 may be formed.

As the number of simultaneous transmission lines CH_M in the noise sensing mode NSM is less than the number of simultaneous transmission lines CH_N in the proximity sensing mode PSM, the first electric field EF1 for sensing noise may be formed. In an embodiment of the present disclosure, the noise sensing mode NSM may be more easily performed by adjusting the number of simultaneous transmission lines to which the drive signal TS is simultaneously applied, such as from N simultaneous transmission lines CH_N to M simultaneous transmission lines CH_M.

Referring to FIGS. 13 and 16, the magnitude of an electric field may be proportional to a frequency. For example, a low-frequency signal having a relatively long wavelength may be transmitted farther than a high-frequency signal having a relatively short wavelength. For example, the lower the frequency, the more expansive (e.g., longer or larger) the electric field, and the higher the frequency, the less expansive (e.g., shorter or smaller) the electric field.

The drive signal TS may be applied to the input sensing part ISP at a predetermined frequency. In the noise sensing mode NSM, the drive signal TS may have a first frequency F1. In the proximity sensing mode PSM, the drive signal TS may have a second frequency F2. The second frequency F2 may be lower than the first frequency F1.

In the noise sensing mode NSM, the first electric field EF1 may be formed when the drive signal TS has the first frequency F1. In the proximity sensing mode PSM, the second electric field EF2 may be formed when the drive signal TS has the second frequency F2. In an embodiment of the present disclosure, the noise sensing mode NSM may be more easily performed by adjusting the frequency of the drive signal TS.

FIGS. 17 to 20 are views illustrating states of a drive signal according to various embodiments of the present disclosure.

Figure 17:
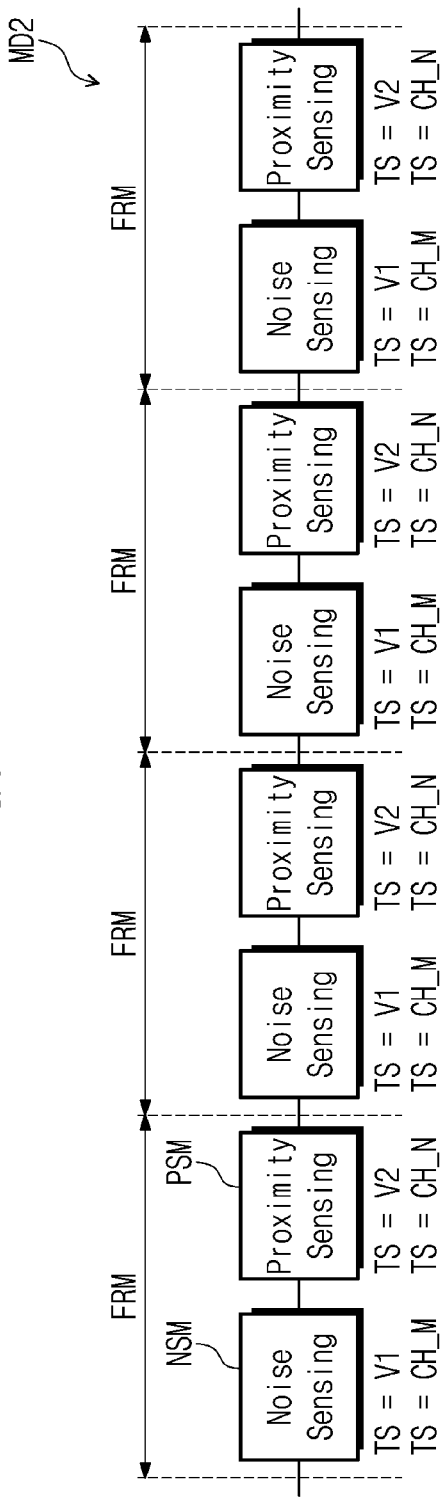

Referring to FIG. 17, the drive signal TS may have the first voltage V1 in the noise sensing mode NSM and may have the second voltage V2 in the proximity sensing mode PSM. The number of simultaneous transmission lines CH_M to which the drive signal TS is simultaneously applied in the noise sensing mode NSM may be M, and the number of simultaneous transmission lines CH_N to which the drive signal TS is simultaneously applied in the proximity sensing mode PSM may be N.

In the noise sensing mode NSM, the first electric field EF1 may be more easily formed as the drive signal TS has the first voltage V1 and the number of simultaneous transmission lines CH_M to which the drive signal TS is simultaneously applied is M.

Figure 18:
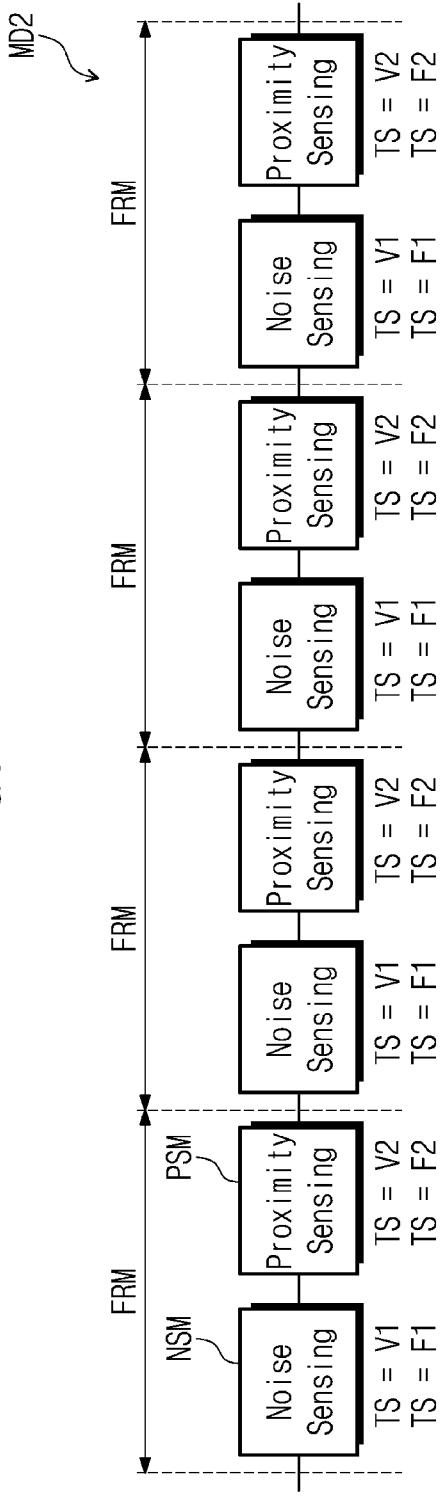

Referring to FIG. 18, the drive signal TS may have the first voltage V1 in the noise sensing mode NSM and may have the second voltage V2 in the proximity sensing mode PSM. The drive signal TS may have the first frequency F1 in the noise sensing mode NSM and may have the second frequency F2 in the proximity sensing mode PSM.

In the noise sensing mode NSM, the first electric field EF1 may be more easily formed as the drive signal TS has the first voltage V1 and the first frequency F1.

Figure 19:
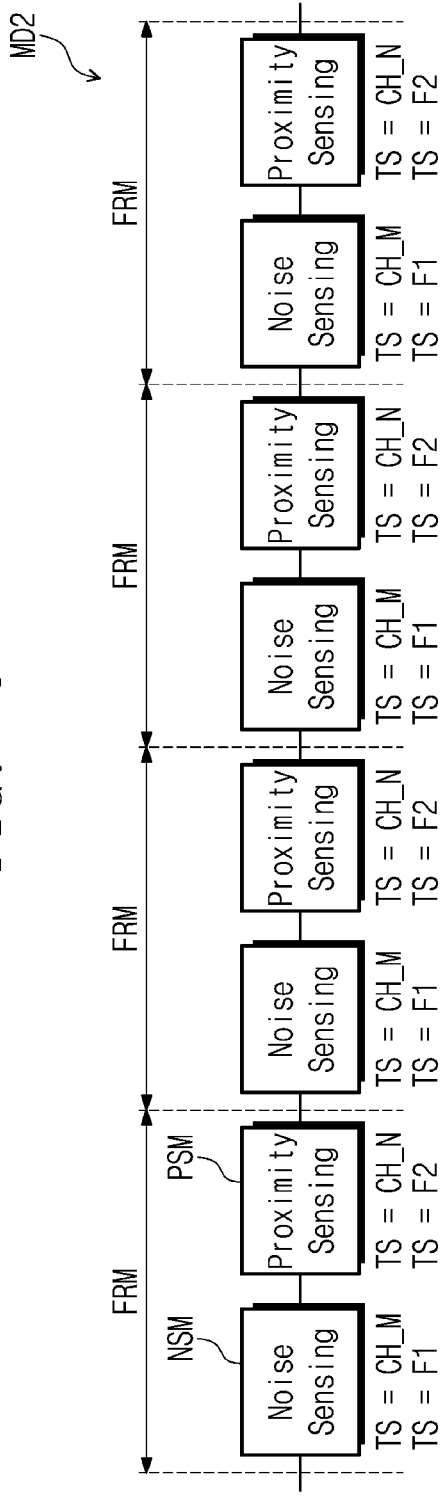

Referring to FIG. 19, the number of simultaneous transmission lines CH_M to which the drive signal TS is simultaneously applied in the noise sensing mode NSM may be M, and the number of simultaneous transmission lines CH_N to which the drive signal TS is simultaneously applied in the proximity sensing mode PSM may be N. The drive signal TS may have the first frequency F1 in the noise sensing mode NSM and may have the second frequency F2 in the proximity sensing mode PSM.

In the noise sensing mode NSM, the first electric field EF1 may be more easily formed as the drive signal TS has the first frequency F1 and the number of simultaneous transmission lines CH_M to which the drive signal TS is simultaneously applied is M.

Referring to FIG. 20, the drive signal TS may have the first voltage V1 in the noise sensing mode NSM and may have the second voltage V2 in the proximity sensing mode PSM. The number of simultaneous transmission lines CH_M to which the drive signal TS is simultaneously applied in the noise sensing mode NSM may be M, and the number of simultaneous transmission lines CH_N to which the drive signal TS is simultaneously applied in the proximity sensing mode PSM may be N. The drive signal TS may have the first frequency F1 in the noise sensing mode NSM and may have the second frequency F2 in the proximity sensing mode PSM.

In the noise sensing mode NSM, the first electric field EF1 may be more easily formed as the drive signal TS has the first voltage V1 and the first frequency F1 and the number of simultaneous transmission lines CH_M to which the drive signal TS is simultaneously applied is M.

FIG. 21 is a diagram illustrating timing of noise sensing and proximity sensing according to an embodiment of the present disclosure.

Referring to FIG. 21, in the second mode MD2, the noise sensing mode NSM may be performed a plurality of times, and the proximity sensing mode PSM may be performed a plurality of times. Unlike the timing illustrated in an embodiment of FIG. 14, the noise sensing mode NSM and the proximity sensing mode PSM may be alternately performed in a first plurality of frames FRM, and only the proximity sensing mode PSM may be performed in a second plurality of frames FRM that does not include the first plurality of frames FRM. According to this operation, the number of times that the proximity sensing mode PSM is performed may be greater than the number of times that the noise sensing mode NSM is performed.

Figure 22:
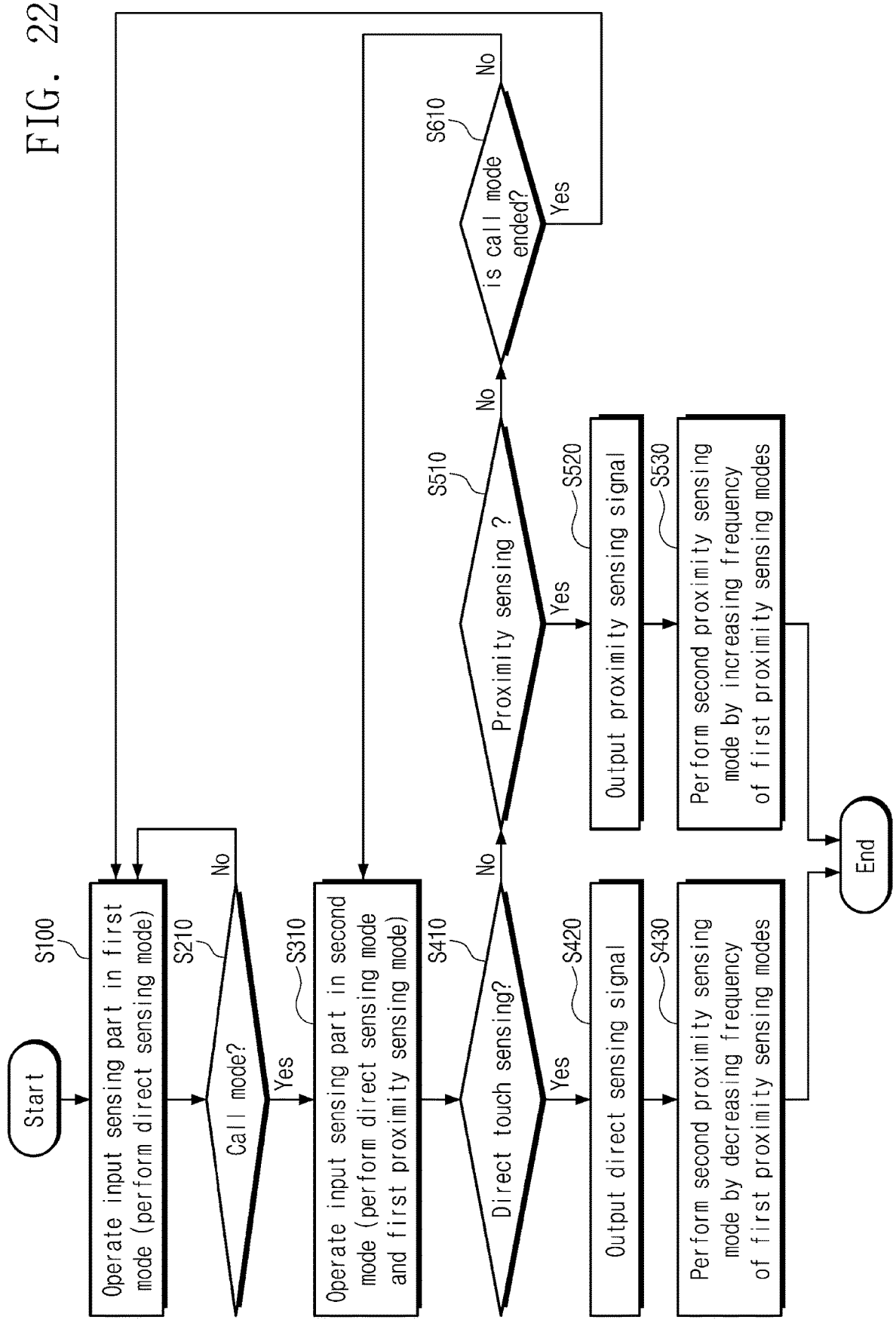
FIG. 22 is a flowchart illustrating a method for driving the display device according to an embodiment of the present disclosure.

FIG. 22 is a flowchart illustrating a method for driving the display device according to an embodiment of the present disclosure.

Referring to FIG. 22, in step S100, the input sensing part ISP may operate in a first mode. The first mode may include a direct sensing mode. The direct sensing mode may be performed in the first mode. In an embodiment, the direct sensing mode may be performed a plurality of times.

In step S210, whether a call mode is performed or not may be detected. When the call mode is performed (e.g., "Yes" in step S210 of FIG. 22), such as when a user is engaged in (e.g., conducts) a telephone call, the process may proceed to step S310. When the call mode is not performed (e.g., "No" in step S210 of FIG. 22), the process may return to step S100.

When the call mode is performed, the input sensing part ISP may operate in a second mode in step S310. The second mode may include a direct sensing mode and a first proximity sensing mode. The direct sensing mode and the first proximity sensing mode may be performed in the second mode. In an embodiment, the direct sensing mode and the first proximity sensing mode may be performed a plurality of times.

Thereafter, when a direct touch of the user or a proximity state of the user is sensed, a second proximity sensing mode which is a proximity mode having a different frequency from the first proximity sensing mode may be performed. Although the number of times that the first proximity sensing mode is performed differs from the number of times that the second proximity sensing mode is performed, embodiments of the present disclosure are not necessarily limited thereto and the proximity sensing operations of the first and second proximity sensing modes may be performed an identical number of times.

For example, in an embodiment, whether the direct touch of the user is sensed or not may be detected in step S410. When the direct touch of the user is sensed in step S410 (e.g., "Yes" in step S410 of FIG. 22), a direct sensing signal may be output in step S420.

In step S430, the second proximity sensing mode may be performed by decreasing the frequency of the performance of the sensing mode as compared to the first proximity sensing mode. The second proximity sensing mode having a lower frequency as compared to the first proximity sensing mode may be performed in Step S430. Accordingly, when the direct touch of the user is sensed in step S410, the second proximity sensing mode is then performed instead of the first proximity sensing mode and the number of times that the second proximity sensing mode is performed is less than the number of times that the first proximity sensing mode was performed prior to the detection of the direct touch sensing.

When the direct sensing signal is output, an event corresponding to the direct sensing signal may be performed. For example, in the call mode, the user may perform a call by activating a speaker on the screen without placing the mobile phone close to the user's ear. At this time, the user may execute another application by touching the other application on the screen while performing the call.

When the direct touch of the user is not sensed in step S410 (e.g., "No" in step S410 in FIG. 22), the process may proceed to step S510, and whether the proximity state of the user is sensed or not may be detected. When the proximity state of the user is sensed in step S510 (e.g., "Yes" in step S510), a proximity sensing signal may be output in step S520.

In step S530, a second proximity sensing mode may be performed by increasing the frequency of the performance of the sensing mode as compared to the first proximity sensing mode. For example, the second proximity sensing mode having a higher frequency than the first proximity sensing mode that is performed prior to the determination of the proximity state may be performed. Accordingly, when a user is sensed as being in proximity, the number of times that the second proximity sensing mode is performed may be greater than the number of times that the first proximity sensing mode is performed prior to the sensing of the proximity state. When the proximity sensing signal is output, the above-described power saving mode may be performed.

When the user is not sensed as being proximate in step S510 (e.g., "No" in step S510 in FIG. 22), the process may proceed to step S610, and whether the call mode is ended or not may be detected. When it is detected in step S610 that the call mode is ended, the process may proceed to step S100, and the input sensing part ISP may operate in the first mode. When it is detected in step S610 that the call mode is not ended, the process may proceed to step S310, and the input sensing part ISP may operate in the second mode.

According to this operation, when the call mode is performed, the number of times that the proximity sensing mode is performed may be varied depending on the direct touch sensing and the proximity sensing while the direct sensing mode and the proximity sensing mode are performed together.

When the direct touch of the user is sensed, the direct sensing mode may be more easily performed by decreasing the number of times that the proximity sensing mode is performed. Therefore, the second proximity sensing mode is performed with less frequency than the first proximity sensing mode performed prior to the sensing of the direct touch of the user. When the proximity state of the user is sensed, the proximity sensing mode may be more easily performed by increasing the number of times that the proximity sensing mode is performed. Therefore, the second proximity sensing mode is performed with a greater frequency than the first proximity sensing mode performed prior to the sensing of the proximity state.

Figure 23:
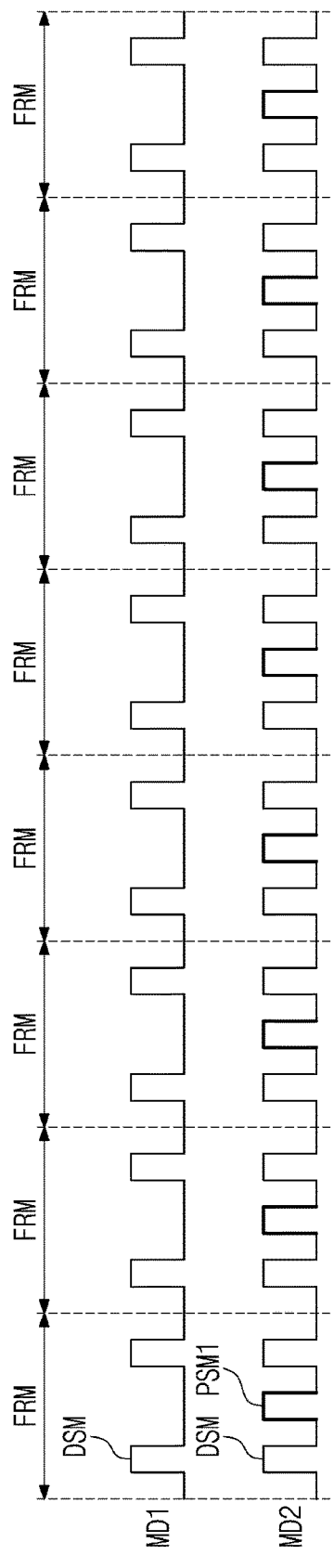
FIG. 23 is a diagram illustrating timing of a direct sensing mode of a first mode and timing of a direct sensing mode and a first proximity sensing mode of a second mode illustrated in FIG. 22 according to embodiments of the present disclosure.

FIG. 23 is a diagram illustrating timing of the direct sensing mode of the first mode and timing of the direct sensing mode and the first proximity sensing mode of the second mode illustrated in FIG. 22.

Hereinafter, FIG. 22 will be described together with FIG. 23 according to the need for explanation and a description of similar or identical elements may be omitted for convenience of explanation. In the timings of FIGS. 23 to 27, the first and second proximity sensing modes PSM1 and PSM2 are illustrated by thicker lines than the direct sensing modes DSM.

Referring to FIGS. 22 and 23, in the first mode MD1, a plurality of direct sensing modes DSM may be performed in each frame FRM. In the second mode MD2, direct sensing modes DSM and first proximity sensing modes PSM1 may be performed. In an embodiment, in each frame FRM, each of the first proximity sensing modes PSM1 may be performed between two direct sensing modes DSM adjacent to each other in time. However, embodiments of the present disclosure are not necessarily limited thereto.

Although it is exemplified in an embodiment of FIG. 23 that the two direct sensing modes DSM and the one first proximity sensing mode PSM1 are performed in each frame, the number of times that the direct sensing mode DSM and the first proximity sensing mode PSM1 are performed and the sequence thereof are not necessarily limited thereto.

Figure 24:
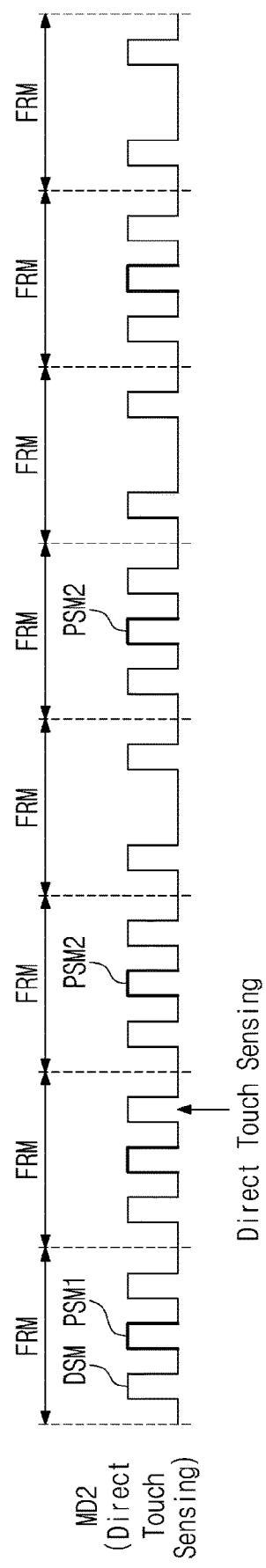
FIG. 24 is a diagram illustrating timing of a direct sensing mode and a second proximity sensing mode of the second mode when a direct touch illustrated in FIG. 22 is sensed according to an embodiment of the present disclosure.
Figure 25:
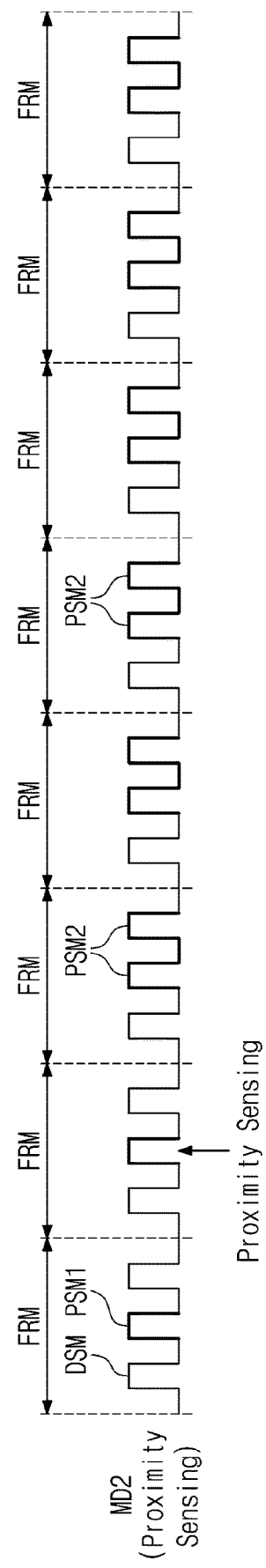
FIGS. 25 to 27 are diagrams illustrating various timings of the direct sensing mode and the second proximity sensing mode of the second mode when a proximity state illustrated in FIG. 22 is sensed according to embodiments of the present disclosure.
Figure 26:
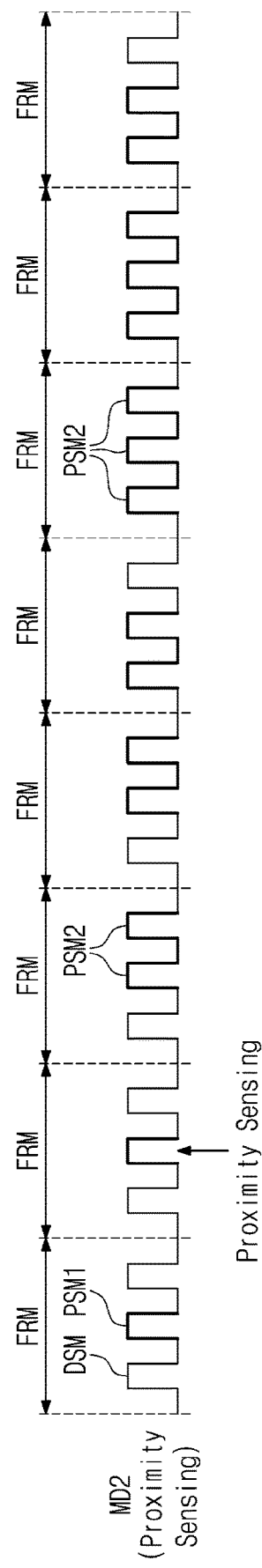
Figure 27:
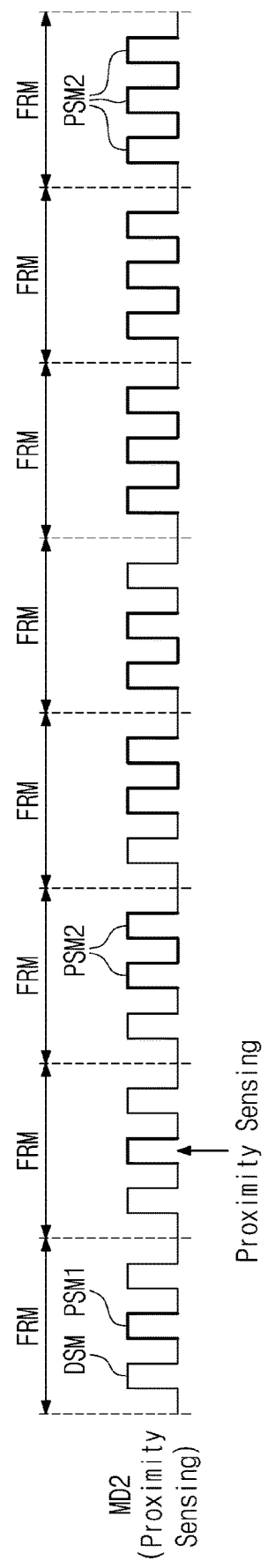

FIG. 24 is a diagram illustrating timing of the direct sensing mode and the second proximity sensing mode of the second mode when the direct touch illustrated in FIG. 22 is sensed. FIGS. 25 to 27 are views illustrating various timings of the direct sensing mode and the second proximity sensing mode of the second mode when the proximity state illustrated in FIG. 22 is sensed.

Hereinafter, FIGS. 22 and 23 will be described together with FIGS. 24 to 27 according to the need for explanation.

Referring to FIGS. 22, 23, and 24, in the second mode MD2, the second proximity sensing modes PSM2 may be performed when the direct touch of the user USR is sensed. In an embodiment, the number of times that the second proximity sensing mode PSM2 is performed may be less than the number of times that the first proximity sensing modes PSM1 is performed prior to the sensing of the direct touch in step S410.

For example, after the direct touch of the user USR is sensed, the second proximity sensing modes PSM2 may not be performed in predetermined frames FRM (such as the fourth, sixth and eight frames in FIG. 24). Accordingly, the number of times the second proximity sensing mode PSM2 is performed may be less than the number of times the first proximity sensing modes PSM1 is performed prior to the sensing of the direct touch in step S410. Furthermore, the number of times that the direct sensing modes DSM are performed may be relatively further increased.

As the number of times that the second proximity sensing modes PSM2 is performed is less than the number of times that the first proximity sensing modes PSM1 is performed, the period of the second proximity sensing modes PSM2 may be longer than the period of the first proximity sensing modes PSM1.

When the direct touch of the user USR is sensed in the call mode, the direct touch of the user USR is predicted to be more frequently performed, and therefore the number of times that the direct sensing modes DSM are performed may be relatively further increased by decreasing the number of the proximity sensing modes performed. Accordingly, when the direct touch of the user USR is sensed in the call mode, the direct sensing modes DSM may be more easily performed.

Referring to FIGS. 22, 23, and 25, in the second mode MD2, the second proximity sensing modes PSM2 may be performed when the proximity state of the user is sensed. After the proximity state of the user USR is sensed (e.g., "Yes" in step S510 of FIG. 22), in each frame FRM, the number of times that the second proximity sensing modes PSM2 are performed may be greater than the number of times that the direct sensing modes DSM are performed. The number of times that the direct sensing modes DSM are performed may decrease. The number of times that the sensing mode is performed in the second proximity sensing mode PSM2 may be greater than the number of times the sensing mode is performed in the first proximity sensing mode PSM1.

As the number of times that the second proximity sensing mode PSM2 is performed is greater than the number of times that the first proximity sensing mode PSM1 is performed, the period of the second proximity sensing mode PSM2 may be shorter than the period of the first proximity sensing mode PSM1.

When the proximity state of the user USR is sensed in the call mode, the user USR is predicted to perform a call while holding the display device DD close to the user's ear, and therefore the number of times that the second proximity sensing mode PSM2 is performed may be increased. Accordingly, when the proximity state of the user USR is sensed in the call mode, the proximity sensing modes may be more easily performed.

Referring to FIGS. 22, 23, 26, and 27, when user USR is sensed as being proximate in the second mode MD2, the number of times that the second proximity sensing mode PSM2 is performed may be gradually increased in frames FRM, compared to the number of times of the first proximity sensing modes PSM1. For example, as illustrated in an embodiment of FIG. 26, the number of times that the second proximity sensing mode PSM2 is performed may be increased to $2^n$. For example, two second proximity sensing modes PSM2 may be performed in the third frame, four second proximity sensing modes PSM2 may be performed in fourth and fifth frames, and eight second proximity sensing modes PSM2 may be performed in sixth, seventh, and eighth frames. Furthermore, as illustrated in FIG. 27, the number of times that the second proximity sensing mode PSM2 is performed may be gradually increased, and thus only the second proximity sensing modes PSM2 may be performed after a specific frame FRM.

Figure 28:
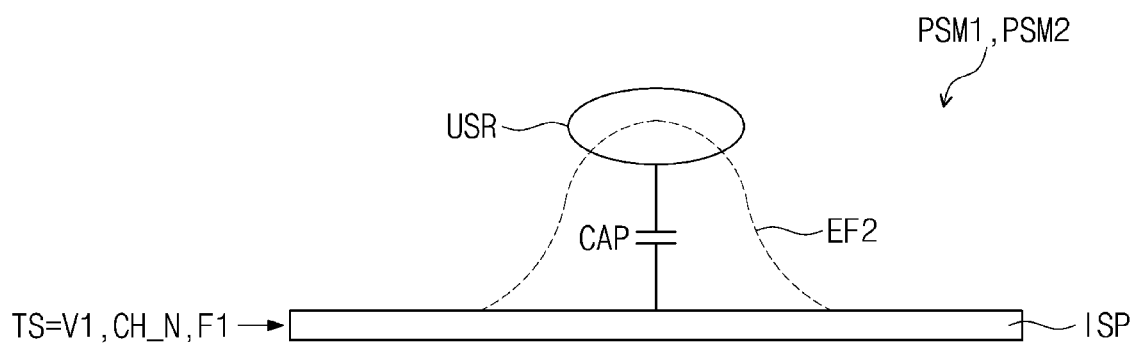
FIG. 28 is a side view illustrating a state of a drive signal applied to the input sensing part in the first and second proximity sensing modes illustrated in FIGS. 24 to 27 according to an embodiment of the present disclosure.
Figure 29:
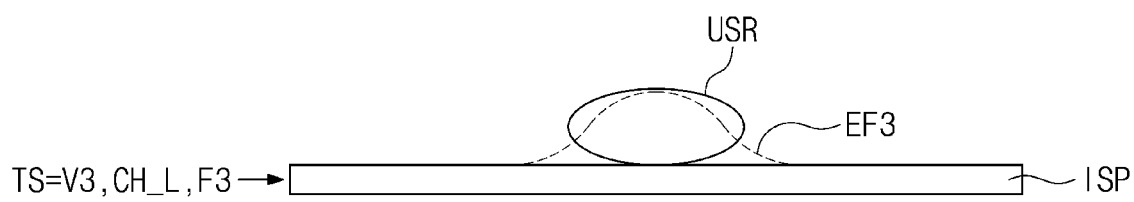
FIG. 29 is a side view illustrating a state of a drive signal applied to the input sensing part in the direct sensing modes illustrated in FIGS. 23 to 27 according to an embodiment of the present disclosure.

FIG. 28 is a view illustrating a state of a drive signal applied to the input sensing part in the first and second proximity sensing modes illustrated in FIGS. 24 to 27. FIG. 29 is a view illustrating a state of a drive signal applied to the input sensing part in the direct sensing modes illustrated in FIGS. 23 to 27.

Referring to FIG. 28, the state of the drive signal TS applied to the input sensing part ISP in the first and second proximity sensing modes PSM1 and PSM2 may be the same as that described above with reference to embodiments of FIGS. 14 to 20. In the first and second proximity sensing modes PSM1 and PSM2, the drive signal TS may have the second voltage V2 and the second frequency F2, and the number of simultaneous transmission lines CH_N to which the drive signal TS is simultaneously applied may be N. Accordingly, the second electric field EF2 may be formed around the input sensing part ISP by the drive signal TS.

Referring to FIG. 29, in the direct sensing mode DSM, the drive signal TS may have a third voltage V3 and a third frequency F3, and the number of simultaneous transmission lines CH_L to which the drive signal TS is simultaneously applied may be L. L is a natural number less than N. Accordingly, a third electric field EF3 may be formed around the input sensing part ISP by the drive signal TS.

Referring to FIGS. 28 and 29, to sense a proximity state of a user that is close to the input sensing part ISP without a touch on the input sensing part ISP, the magnitude of the second electric field EF2 in the first and second proximity sensing modes PSM1 and PSM2 may be greater than the magnitude of the third electric field EF3 in the direct sensing mode DSM. To form the second electric field EF2 greater than the third electric field EF3, the drive signal TS may be set as follows.

The second voltage V2 of the drive signal TS may have a higher level than the third voltage V3 of the drive signal TS. The number of simultaneous transmission lines CH_N to which the drive signal TS is simultaneously applied may be greater than the number of simultaneous transmission lines CH_L to which the drive signal TS is simultaneously applied. The second frequency F2 of the drive signal TS may be lower than the third frequency F3 of the drive signal TS. In this embodiment, the second electric field EF2 formed in the proximity sensing mode may be greater than the third electric field EF3 formed in the direct sensing mode, and thus proximity sensing of the user USR may be more easily performed.

One or two of voltage, simultaneous transmission lines, or frequency may be adjusted, or all of them may be adjusted. For example, at least one of the voltage level of the drive signal TS, the number of simultaneous transmission lines to which the drive signal TS is simultaneously applied, or the frequency of the drive signal TS may be differently set in the direct sensing modes DSM as compared to the first and second proximity sensing modes PSM1 and PSM2.

According to embodiments of the present disclosure, noise of the input sensing part caused by the display panel in the call mode may be removed, and thus the sensitivity of proximity sensing through the input sensing part may be increased.

According to embodiments of the present disclosure, the direct sensing mode and the proximity sensing mode may be performed together in the call mode. When the direct touch of the user or the proximity state of the user is sensed, the number of times that the proximity sensing is performed may be changed, and thus the direct sensing mode and the proximity sensing mode may be more easily performed in the call mode.

While the present disclosure has been described with reference to embodiments thereof, it will be apparent to those of ordinary skill in the art that various changes and modifications may be made thereto without departing from the spirit and scope of the present disclosure.

What is claimed is:

1. A method for driving a display device, the method comprising:
   operating an input sensing part in a direct sensing mode, the input sensing part including a plurality of first sensing electrodes connected to a plurality of transmission lines and a plurality of second sensing electrodes connected to a plurality of sensing lines;

operating the input sensing part in a noise sensing mode and a proximity sensing mode when a call mode is performed based on a user being engaged in a telephone call, the proximity sensing mode including generation of a proximity sensing signal concerning a proximity of the user to the display device; and removing noise sensed in the noise sensing mode from the proximity sensing signal when the proximity sensing signal indicates a proximity state of the user, wherein at least one of a voltage level of a drive signal applied to the plurality of transmission lines, a number of simultaneous transmission lines to which the drive signal is simultaneously applied, or a frequency of the drive signal is differently set in the noise sensing mode as compared to the proximity sensing mode, and wherein the input sensing part generates an electric field in the noise sensing mode having a magnitude that is less than a magnitude of an electric field generated by the input sensing part in the proximity sensing mode.

2. The method of claim 1, wherein the voltage level of the drive signal in the noise sensing mode is less than the voltage level of the drive signal in the proximity sensing mode.

3. The method of claim 1, wherein the number of simultaneous transmission lines in the noise sensing mode is less than the number of simultaneous transmission lines in the proximity sensing mode.

4. The method of claim 1, wherein the frequency of the drive signal in the noise sensing mode is greater than the frequency of the drive signal in the proximity sensing mode.

5. The method of claim 1, wherein in the noise sensing mode, the electric field is applied to a display panel positioned under the input sensing part and is not applied to the user above the input sensing part.

6. The method of claim 5, wherein the operating of the input sensing part in the noise sensing mode includes sensing noise of the input sensing part caused by the display panel.

7. The method of claim 1, wherein:
the voltage level of the drive signal in the noise sensing mode is less than the voltage level of the drive signal in the proximity sensing mode; and
the number of simultaneous transmission lines in the noise sensing mode is less than the number of simultaneous transmission lines in the proximity sensing mode.

8. The method of claim 1, wherein:
the voltage level of the drive signal in the noise sensing mode is less than the voltage level of the drive signal in the proximity sensing mode; and
the frequency of the drive signal in the noise sensing mode is greater than the frequency of the drive signal in the proximity sensing mode.

9. The method of claim 1, wherein:
the number of simultaneous transmission lines in the noise sensing mode is less than the number of simultaneous transmission lines in the proximity sensing mode; and
the frequency of the drive signal in the noise sensing mode is greater than the frequency of the drive signal in the proximity sensing mode.

10. The method of claim 1, wherein:
the voltage level of the drive signal in the noise sensing mode is less than the voltage level of the drive signal in the proximity sensing mode;
the number of simultaneous transmission lines in the noise sensing mode is less than the number of simultaneous transmission lines in the proximity sensing mode; and
the frequency of the drive signal in the noise sensing mode is greater than the frequency of the drive signal in the proximity sensing mode.

11. The method of claim 1, wherein:
the proximity sensing mode and the noise sensing mode are each performed a plurality of times; and
a number of times that the proximity sensing mode is performed is larger than a number of times that the noise sensing mode is performed.

12. A method for driving a display device, the method comprising:
operating an input sensing part in a direct sensing mode, the input sensing part including a plurality of first sensing electrodes connected to a plurality of transmission lines and a plurality of second sensing electrodes connected to a plurality of sensing lines;
operating the input sensing part in the direct sensing mode and a first proximity sensing mode, when a call mode is performed, the first proximity sensing mode is performed a first number of times; and
operating the input sensing part in a second proximity sensing mode when a direct touch of a user is sensed or a proximity state of the user is sensed, the second proximity sensing mode is performed a second number of times that is different from the first number of times of the first proximity sensing mode,
wherein when the direct touch of the user is sensed, the second number of times that the second proximity sensing mode is performed is less than the first number of times that the first proximity sensing mode is performed.

13. The method of claim 12, wherein in each frame, the first proximity sensing mode is performed between two adjacent performances of the direct sensing mode.

14. The method of claim 12, wherein when the proximity state of the user is sensed, the second number of times that the second proximity sensing mode is performed is greater than the first number of times that the first proximity sensing mode is performed.

15. The method of claim 14, wherein when the proximity state of the user is sensed, in each frame, the second number of times that the second proximity sensing mode is performed is greater than a number of times that the direct sensing mode is performed.

16. The method of claim 14, wherein when the proximity state of the user is sensed the second number of times that the second proximity sensing mode is performed gradually increases.

17. The method of claim 12, wherein:
when the direct touch of the user is sensed, a period of the second proximity sensing mode is greater than a period of the first proximity sensing mode; and
when the proximity state of the user is sensed, the period of the second proximity sensing modes is less than the period of the first proximity sensing modes.

18. The method of claim 12, wherein at least one of a voltage level of a drive signal applied to the plurality of transmission lines, a number of simultaneous transmission lines to which the drive signal is simultaneously applied, or a frequency of the drive signal is differently set in the direct sensing mode as compared to the first and second proximity sensing modes.

19. The method of claim 18, wherein:
the voltage level of the drive signal in the first and second proximity sensing modes is greater than the voltage level of the drive signal in the direct sensing mode;
the number of simultaneous transmission lines in the first and second proximity sensing modes is greater than the number of simultaneous transmission lines in the direct sensing mode; and
the frequency of the drive signal in the first and second proximity sensing modes is less than the frequency of the drive signal in the direct sensing mode.

* * * * *